United States Patent
Liu et al.

(10) Patent No.: US 12,242,060 B2
(45) Date of Patent: Mar. 4, 2025

(54) MULTI-PUPIL EXPANSION LIGHT GUIDE ASSEMBLY WITH ROD

(71) Applicant: OPTINVENT, Rennes (FR)

(72) Inventors: Yao Liu, Rennes (FR); Khaled Sarayeddine, Rennes (FR); Simon Julien, Rennes (FR)

(73) Assignee: OPTINVENT, Rennes (FR)

( * ) Notice: Subject to any disclaimer, the term of this patent is extended or adjusted under 35 U.S.C. 154(b) by 646 days.

(21) Appl. No.: 17/667,030

(22) Filed: Feb. 8, 2022

(65) Prior Publication Data

US 2023/0251412 A1    Aug. 10, 2023

(51) Int. Cl.
*G02B 27/01* (2006.01)
*F21V 8/00* (2006.01)

(52) U.S. Cl.
CPC ....... *G02B 27/0172* (2013.01); *G02B 27/017* (2013.01); *G02B 6/0028* (2013.01); *G02B 6/0036* (2013.01); *G02B 2027/0174* (2013.01); *G02B 27/0176* (2013.01); *G02B 2027/0178* (2013.01)

(58) Field of Classification Search
CPC .............. G02B 27/017; G02B 27/0172; G02B 27/0176; G02B 2027/0178; G02B 2027/0174
See application file for complete search history.

(56) References Cited

U.S. PATENT DOCUMENTS

| | | | |
|---|---|---|---|
| 8,433,172 B2 | 4/2013 | Pascal et al. | |
| 9,285,590 B2 | 3/2016 | Dubroca et al. | |
| 10,247,943 B1* | 4/2019 | Yu | G02B 27/0176 |
| 2004/0085649 A1* | 5/2004 | Repetto | G02B 27/0101 359/633 |
| 2006/0132914 A1* | 6/2006 | Weiss | G02B 30/40 359/462 |
| 2015/0241619 A1* | 8/2015 | Richards | G02B 6/0045 29/458 |
| 2017/0315358 A1* | 11/2017 | Masuda | G02B 6/002 |
| 2017/0322417 A1* | 11/2017 | Sekiguchi | G02B 5/09 |
| 2017/0336552 A1* | 11/2017 | Masuda | G02B 27/0101 |
| 2018/0210202 A1* | 7/2018 | Danziger | G02B 5/30 |
| 2018/0329208 A1* | 11/2018 | Masuda | G02B 6/0036 |
| 2020/0081251 A1* | 3/2020 | Mohammed | G02B 27/145 |

(Continued)

*Primary Examiner* — Bao-Luan Q Le
(74) *Attorney, Agent, or Firm* — Williams Mullen; R. Brian Drozd

(57) ABSTRACT

A system includes a transparent rod, a light guide assembly, and first and second transparent monolithic optical parts (TMOPs) having the same refractive index. The first TMOP has a first surface having two prism arrays separated by a flat surface having a partially reflective coating, and an opposite second flat surface. Each prism array has two prisms having first and second surfaces oblique to each other. The prism arrays' first surfaces have a partially reflective coating contrary to the second surfaces. The second TMOP has a surface having a geometrically complementary shape relative to the first TMOP first surface's shape and has an opposite second flat surface. When assembled using a first optically transparent adhesive, the first and second TMOPs' second surfaces are parallel. The rod has a partially reflective gradient coating on one surface where it's assembled with the light guide assembly using a second optically transparent adhesive.

15 Claims, 13 Drawing Sheets

(56) References Cited

U.S. PATENT DOCUMENTS

2020/0150330 A1   5/2020   Danziger et al.
2020/0150332 A1   5/2020   Nakamura et al.
2020/0257034 A1*  8/2020   Masuda ............. G02B 27/0101
2021/0141230 A1*  5/2021   Shih ................... G02B 27/0081

* cited by examiner

MULTI-PUPIL EXPANSION LIGHT GUIDE ASSEMBLY WITH ROD

TECHNICAL DOMAIN

The present invention relates to a rod-equipped light guide assembly including one or more rods and a light guide assembly formed by two complementary transparent monolithic optical parts having on their surfaces, which face each other when said two optical parts are assembled, several arrays of microstructures to provide guidance, 2D expansion and extraction of rays of a virtual image in-coupled to the one or more rods.

BACKGROUND ART

Light guides (or waveguides) can be made of an optical transparent material (plastic, glass, etc.) and be used to transport rays of light by total internal reflection from one zone to another of the light guide. Such a light guide is for example used in augmented reality headsets to enable a user to see a virtual image superimposed on the real world.

Usually a display engine (or collimator system) generates a virtual image at large distance or infinity. The virtual image is in-coupled to the light guide by means of in-coupler optics. Rays of the in-coupled virtual image travel through the light guide by total internal reflection and hit an out-coupler that extracts the light in front of the user eye. The out-coupler includes prism microstructures with a semi-reflective coating on oblique surfaces of the prism microstructures to extract the rays of the virtual image which have the right direction in space and to project the virtual image into the user's eye.

The collimator system is generally made of an image source coupled with lenses and/or mirrors to enlarge a virtual image provided by the image source and collimate said virtual image, generally at infinity focus. The image source could be either LCOS (Liquid Crystal on Silicon), LCD (Liquid Cristal Display), OLED (Organic Light-Emitting Diode), μLED (Micro Light Emitting Diode) or MEMS (Micro opto Electro Mechanical System).

Such an arrangement is disclosed in the U.S. Pat. No. 8,433,172, as similarly depicted in FIG. 1. A light guide 100 has an upper surface 101 and a lower surface 104. The upper surface 101 includes a prism array, while the lower surface 104 is flat. Each prism of the prism array is composed of a first surface 102 and a second surface 103 which are oblique with respect to each other and with respect to the lower surface 104. The surfaces 102 of the prisms of the prism array are parallel to each other, and the surfaces 103 of the prisms of the prism array are also parallel to each other. The surfaces 103, on which a semi-reflective coating is applied, are intended to extract the rays of the virtual image out of the light guide and into the user's eye. No coating is applied on the surfaces 102.

Another arrangement enabling see-through effect is disclosed in the U.S. Pat. No. 9,285,590. The see-through effect (or transparency) is permitted by a first light guide part 100 that has a prism array on one 101 of its surfaces, as already shown in FIG. 1, which is covered by a partially reflective coating applied on all its surfaces. The first light guide part is complemented by a second light guide part 200, referred to as a cover-plate, also having a prism array on one 201 of its surfaces. The prism array of the second light guide part 200 has a complementary shape to the prism array of the first light guide part 100, as illustrated in FIG. 2. The two light guide parts 100 and 200 are assembled together with a transparent glue 205 with nearly a constant thickness, such as to form a light guide assembly 210.

The prism arrays described above can be made by a diamond cut process, but are generally manufactured by molding techniques, including injection molding, injection compression molding, hot embossing, resin thermoforming or by using a UV-cured monomer.

The current market trend for smart glasses or head mounted display devices is to have large field of view displays that look like a normal pair of glasses. However, the prism arrays described in the U.S. Pat. No. 9,285,590 referenced above are unidimensional and cannot allow injecting images with large field of view, unless it is done with a very thick light guide or with a large sized collimator system. Therefore, it is necessary to provide a thin light guide close to an ophthalmic lens form factor, as well as a small size and lightweight collimator system that can fit within an eyeglass frame temple.

Other prior art patent documents disclose the use of rod in association with a light guide, as shown in FIGS. 3A and 3B. In these prior art patent documents, the rod includes partially reflective array to extract the light out of the rod itself. FIG. 3A relates to US application publication 2020/0150330 A1, which discloses a system in which a rod is associated to a light guide to perform 2D-Pupil expansion. The rod is made by an assembly of partially reflective surfaces. FIG. 3B relates to US application publication 2020/0150332 A1, which discloses a similar system, except that the arrangement of partially reflective surfaces inside the rod is tilted. In both systems, one main difficulty is to manufacture such a rod since tolerance of rod assembly is quite challenging and another main difficulty is to reduce ghost images.

It is thus desirable to provide an optical solution to meet the above requirements, namely having a small sized collimator system with a small exit pupil which is in-coupled to a thin light guide arrangement, to allow a large field of view and large eye-box. A pupil extension in multiple directions within a light guide has then to be performed. It is furthermore desirable to provide such an optical solution that is easy to manufacture. It is furthermore desirable to provide such an optical solution that reduces ghost images.

SUMMARY OF THE INVENTION

To this end, it is proposed herein a rod-equipped light guide assembly comprising a rod and a light guide assembly, wherein the light guide assembly comprises a first transparent monolithic optical part having a refractive index, and a second transparent monolithic optical part having the same refractive index as the first transparent monolithic optical part. The first transparent monolithic optical part has a first surface having two prism arrays separated by a flat surface, the flat surface has a partially reflective coating thereon, and the first transparent monolithic optical part further has an opposite second surface that is flat. Each prism array of the first surface of the first transparent monolithic optical part has at least two prisms, each prism being composed of a first surface and a second surface which are oblique with respect to each other and with respect to said opposite second surface of the first transparent monolithic optical part, the first surfaces of the prism arrays have a partially reflective coating thereon and the second surfaces of the prism arrays have no reflective coating thereon. The second transparent monolithic optical part has a first surface having a geometrically complementary shape with respect to the shape of the first surface of the first transparent monolithic optical part, and the second transparent monolithic optical part of the light guide assembly further has an opposite second surface that is flat. The first and second transparent monolithic optical parts are assembled together using a first optically transparent adhesive material, such that the second surfaces of the first and second transparent monolithic optical parts of the light guide assembly are parallel to each other, the first optically transparent adhesive material having the same refractive index as the first and second transparent monolithic optical parts. Furthermore, the rod is transparent and has a partially reflective gradient coating on one of its surfaces via which the rod is assembled with the light guide assembly using a second optically transparent adhesive material.

Thus, the use of the rod in conjunction with the light guide assembly as arranged above for forming the rod-equipped light guide assembly enables achieving pupil extension in multiple directions. Therefore, a collimator system of reduced sized with reduced exit pupil can be used to in-couple rays of a virtual image in such a rod-equipped light guide assembly.

In a particular embodiment, the rod comprises an in-coupling zone for in-coupling rays of a virtual image.

In a particular embodiment, the rod-equipped light guide assembly according to claim 2, wherein: the flat surface between the prism arrays of the first surface of the first transparent monolithic optical part implements a splitting-plus-expansion function with respect to the rays of the virtual image; the last prism array of the first surface of the first transparent monolithic optical part, with respect to a global direction of propagation of the rays of the virtual image in the light guide assembly, implements a multiplication-plus-extraction function with respect to the rays of the virtual image; the first prism array of the first surface of the first transparent monolithic optical part, with respect to a global direction of propagation of the rays of the virtual image in the light guide assembly, implements a multiplication function with respect to the rays of the virtual image; and the rod implements a splitting and in-coupling function with respect to the rays of the virtual image by in-coupling the rays of the virtual image in the light guide assembly by portions thereof along internal propagation of rays of the virtual image inside the rod.

In a particular embodiment, the second optically transparent adhesive material is identical to the first optically transparent adhesive material.

In a particular embodiment, the rod is located in a same plane as the light guide assembly, the rod being assembled onto the edge of the light guide assembly.

In a particular embodiment, the rod is assembled with the light guide assembly on one external large surface of the light guide assembly.

In a particular embodiment, a reflecting mirror is assembled with the rod and the light guide assembly by the second transparent adhesive material thus joining an edge of the light guide assembly and one long face of the rod to said reflecting mirror, the long face of the rod which is in contact with the reflecting mirror via said second transparent adhesive material is perpendicular to a long face of the rod used to make interface with the light guide assembly.

In a particular embodiment, the rod comprises an embedded partially reflective flat surface, wherein position and length of the embedded partially reflective surface in the rod are determined using the less oblique field where transmitted and reflected rays cross after one total internal reflection on an external flat surface of the rod.

In a particular embodiment, reflectivity of partially reflective gradient coating is adjusted by steps over distance, all steps having equal distance range size, and wherein the reflectivity is constant over each step and decreases from one step to another with distance from the in-coupling zone.

In a particular embodiment, the rod has the same refractive index as the first and second monolithic optical parts of the light guide assembly.

In a particular embodiment, the rod-equipped light guide assembly comprises another rod, wherein both rods are perpendicular to each other in a L-shape, both rods being assembled with the light guide assembly and having a junction between the rods having a partially reflective coating thereon.

It is further proposed herein a display module formed by an assembly of the rod-equipped light guide assembly according to claim 1 and a collimator system, wherein the collimator system is arranged with the rod-equipped light guide assembly for projecting a virtual image at infinity and in-coupling rays of the virtual image in the rod.

It is further proposed herein a head-mounted display comprising such a display module.

It is further proposed herein a head-up display comprising such a display module.

It is further proposed herein a method for manufacturing a rod-equipped light guide assembly, comprising performing a manufacturing process to manufacture a rod that is transparent and to manufacture a first transparent monolithic optical part having a refractive index and a second transparent monolithic optical part having the same refractive index as the first transparent monolithic optical part. Following the manufacturing process: the first transparent monolithic optical part has a first surface having two successive sets composed of one flat surface followed by one prism array, and the first transparent monolithic optical part further has an opposite second surface that is flat; each prism array of the first surface of the first transparent monolithic optical part has at least two prisms, each prism being composed of a first surface and a second surface which are oblique with respect to each other and with respect to said opposite second surface of the first transparent monolithic optical part; the second transparent monolithic optical part has a first surface having a geometrically complementary shape with respect to the shape of the first surface of the first transparent monolithic optical part, and the second transparent monolithic optical part of the light guide assembly further has an opposite second surface that is flat. Furthermore, the manufacturing process further comprises: applying a partially-reflective coating on the flat surface between the prism arrays of the first transparent monolithic optical part and on the first surfaces of the prism arrays of the first transparent monolithic optical part, while the second surfaces of the prism arrays of the first transparent monolithic optical part have no reflective coating thereon; assembling the first and second transparent monolithic optical parts together using an optically transparent adhesive material, such that the second surfaces of the first and second transparent monolithic optical parts of the light guide assembly are parallel to each other, the optically transparent adhesive material having the same refractive index as the first and second transparent monolithic optical parts; applying a partially reflective gradient coating on one surface of the rod; and assembling the rod with the light guide assembly, using a second optically transparent adhesive material, via the surface on which the partially reflective gradient coating has been applied.

DESCRIPTION OF THE DRAWINGS

The characteristics of the invention will emerge more clearly from a reading of the following disclosure of at least one embodiment, said disclosure being produced with reference to the accompanying drawings, among which.

DESCRIPTION OF EMBODIMENTS

Figure 1:
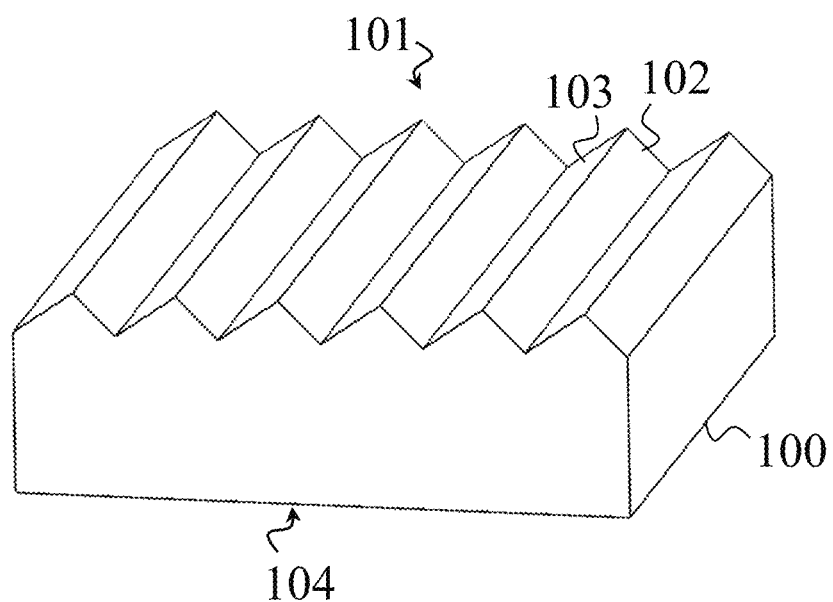
FIG. 1 schematically represents a first prior art arrangement.
Figure 2:
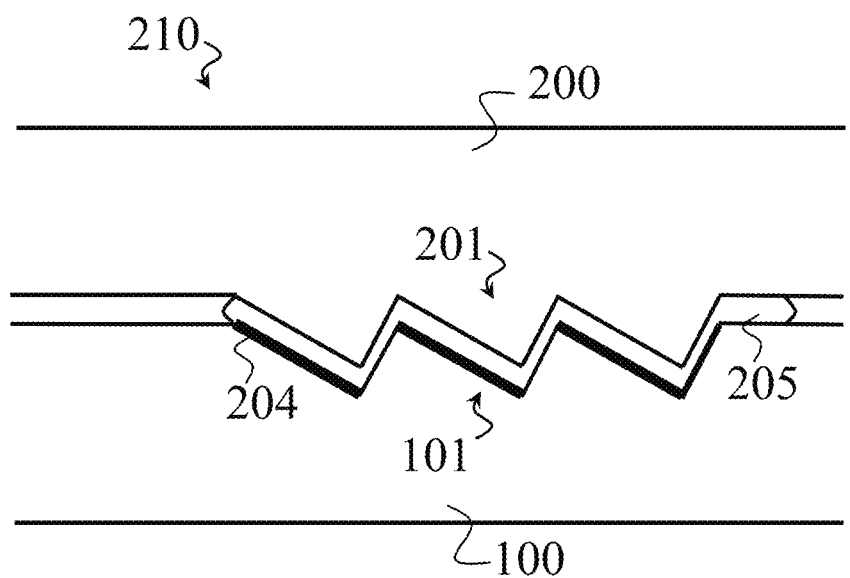
FIG. 2 schematically represents a second prior art arrangement.
Figure 3A:
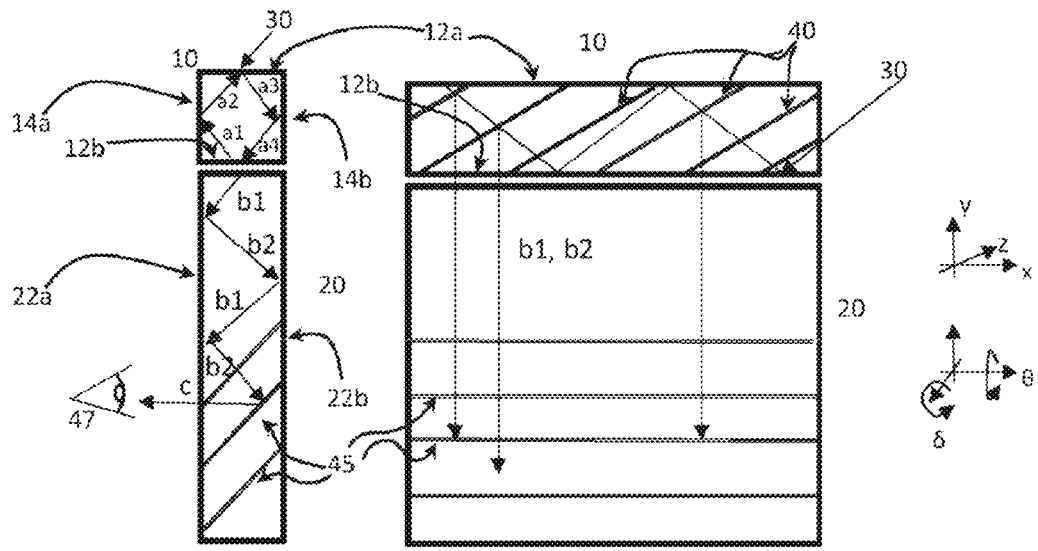
FIG. 3A schematically represents a third prior art arrangement.
Figure 3B:
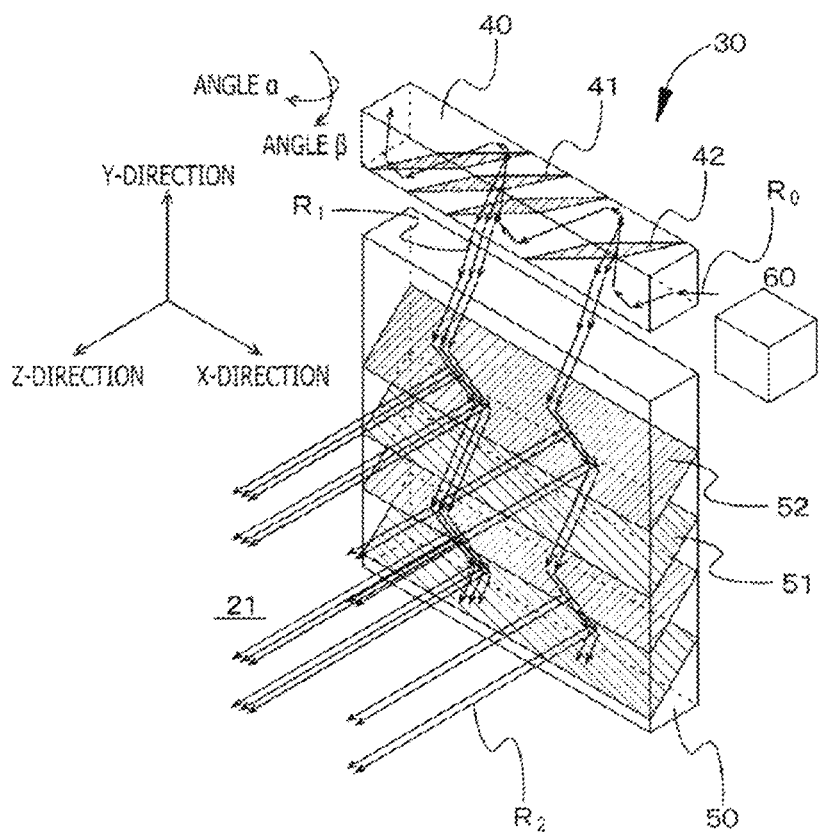
FIG. 3B schematically represents a fourth prior art arrangement.

It is an object of this invention to provide a rod-equipped light guide assembly, in which a virtual image is in-coupled and rays thereof are expanded and propagated, and from which said rays are extracted to a predefined eye-box.

The rod-equipped light guide assembly comprises a light guide assembly having first and second transparent monolithic optical parts, which are assembled together, and a transparent rod, which may itself be a monolithic optical part, coupled to the light assembly. The first and second transparent monolithic optical parts have the same refractive index. The rod may have the same refractive index as the first and second transparent monolithic optical parts of the light guide assembly. For instance, the rod and the first and second transparent monolithic optical parts of the light guide assembly are all made of a transparent plastic material or of transparent glass. In a variant, the rod has a refractive index that is slightly different than the refractive index of the first and second transparent monolithic optical parts of the light guide assembly. For instance, the first and second transparent monolithic optical parts of the light guide assembly are made of a transparent plastic material and the rod is made of transparent glass.

The rod-equipped light guide assembly is designed such that rays of a collimated virtual image can be in-coupled therein, and more particularly in the rod, and propagate inside the rod-equipped light guide assembly by total internal reflection from an in-coupling zone of the rod to an out-coupling zone of the light guide assembly where said rays are extracted from the light guide assembly. To achieve such a guiding function, the rod is assembled with the light guide assembly such that a junction between the rod and the light guide assembly ensures passing of rays of the virtual images from the rod, in which the rays of the virtual images are in-coupled, to the light guide assembly, from which the rays of the virtual images are out-coupled.

The rod has a regular solid rectangle cross section (perpendicular to its longest dimension) along the junction with the light guide assembly. Preferably, the rod has a regular solid square cross section along the junction with the light guide assembly. The dimensions, and more particularly their ratio, of the aforementioned section of the rod depends on entry pupil size. This statement thus excludes in-coupling means of the rod, which may modify the general shape of the rod at one of its ends, as detailed hereinafter.

The rod is assembled to the light guide assembly by an adhesive transparent material. A face of the rod is used for doing so. This face of the rod has a partially reflective gradient coating thereon, which forms an interface between the rod and the light guide assembly, such that its reflectivity changes from one end of the partially reflective gradient coating located nearby the in-coupling zone toward an opposite end point of the rod. This reflectivity decreases from an upper value nearby the in-coupling zone to reach a lower value (e.g., 0%, which means 100% transmission) at the opposite end point of the partially reflective gradient coating. When rays of the virtual image are in-coupled to the rod, the rays of the virtual image are transmitted inside the rod by total internal reflection, except when hitting the interface between the rod and the light guide assembly, where the partially reflected gradient coating splits the rays of the virtual image into rays reflected that continue to propagate inside the rod and rays that are transmitted to the light guide assembly. The rays transmitted to the light guide assembly hit a first prism array, referred to as the O—O element, of the light guide assembly. Once these rays hit an active surface of the O—O element, they are reflected and continue to be guided by total internal reflection inside the light guide assembly for further propagation therein.

The first transparent monolithic optical part of the light guide assembly has a first surface having two prism arrays: the aforementioned O—O element and another array, referred to as the Y—Y element. The first surface of the first transparent monolithic optical part has a flat portion, referred to as 150 element. This flat portion between the two prism arrays has a partially reflective coating thereon. The first transparent monolithic optical part of the light guide assembly further has a second opposite flat surface.

Each prism array of the first surface of said first transparent monolithic optical part has at least two prisms. Each prism is composed of a first surface and a second surface which are oblique with respect to each other and with respect to said second opposite surface. In one particular embodiment, the first surfaces of the prisms of the prism array in question are parallel to each other, and the second surfaces of the prisms of the prism array in question are also parallel to each other. In one embodiment, the first surfaces of the prisms of the prism array in question are oblique flat surfaces. In other embodiments, the first and second surfaces of the prisms of the prism array in question have other shapes. The first surfaces of the prism arrays have a partially reflective coating thereon. The second surfaces of the prism arrays have no reflective coating thereon (except some coating residuals due to inaccuracy of the manufacturing process). The first surfaces of the prism arrays are referred to as the active surfaces, since rays hitting said first surfaces are reflected, either for rays' expansion or for rays' extraction. The second surfaces of the prism arrays are referred to as the passive surfaces, since rays hitting said second surfaces are transmitted via said second surfaces.

The O—O element, which is the first prism array of the light guide assembly which is encountered by the rays of the virtual image issued from the rod, is referred to as the multiplication array and implements a multiplication function with respect to the rays of the virtual image.

The 150 element is referred to as the splitting-plus-expansion surface and implements a splitting-plus-expansion function with respect to the rays of the virtual image.

The Y—Y element, which is the second prism array of the light guide assembly which is encountered by the rays of the virtual image which propagate in the light guide assembly, is referred to as the multiplication-plus-extraction array and implements a multiplication-plus-extraction function with respect to the rays of the virtual image.

The second transparent monolithic optical part of the light guide assembly has a first surface having a geometrically complementary shape with respect to the shape of the first surface of the first transparent monolithic optical part of the light guide assembly. The second transparent monolithic optical part of the light guide assembly further has a second opposite flat surface.

The first and second transparent monolithic optical parts of the light guide assembly are assembled together using an optically transparent adhesive material, such as glue, such that the second surfaces of the first and second transparent monolithic optical parts of the light guide assembly are parallel to each other after the assembly. The transparent adhesive material has the same, or substantially the same, refractive index as the first and second transparent monolithic optical parts of the light guide assembly. The light guide assembly is therefore transparent for ambient rays of the external scene (real world) that are incident on either of the second surfaces of the first and second transparent monolithic optical parts of the light guide assembly. After assembling the first and second transparent monolithic optical parts together to form the light guide assembly, the rod is assembled with the light guide assembly using a transparent adhesive material having preferably the same refractive index as the light guide assembly parts and the rod. The position and potential alignment of the rod with the light guide assembly is detailed hereafter.

The rays of the virtual image are in-coupled in the light guide assembly via the rod. Several in-coupling configurations are disclosed hereafter. The rays of the virtual image are in-coupled to the right side of the rod in a rod injection area that form the in-coupling zone, or similarly to the left side of the rod (depending on whether the rod-equipped light guide assembly is for user's right eye or for user's left eye). All these rays are guided inside the rod by total internal reflection between the four long surfaces of the rod. When the guided rays hit the partially reflective gradient coating at the interface between the rod and the light guide assembly, the rays of the virtual image split as already explained. A portion of ray intensity is reflected and continues to be guided inside the rod, and another portion thereof is transmitted and in-coupled to the light guide assembly. The portion of ray intensity in-coupled to the light guide assembly is transmitted by the active surfaces of the O—O element and guided inside the light guide assembly, while another portion of ray intensity is reflected by the active surfaces of the O—O element, generating thus multiple rays having the same direction. These multiple rays then hit the 150 element, thus generating rays reflected by the 150 element in addition to rays transmitted by the 150 element. The resulting rays continue to be guided in the light guide assembly by total internal reflection and eventually hit prisms of the Y—Y element. A portion of ray intensity (e.g., 15%) is then reflected, depending on characteristics of the coating applied on the active surfaces of the Y—Y element, and therefore extracted from the light guide assembly by the hit prisms of the Y—Y element, while another portion of ray intensity is transmitted and therefore continues to be guided inside the light guide assembly to be further extracted by other prisms of the Y—Y element.

The foregoing description applies for any ray bundle that is in-coupled into the rod. An entry pupil delivers rays of the virtual image to the in-coupling zone. Each ray direction represents one field of view. When all rays of all fields of view are emitted from the entry pupil, the rays propagate inside the rod-equipped light guide assembly as described above. The rays extracted out of the light guide assembly by the Y—Y element represent the extracted field of view, which enables projecting the virtual image through the predefined eye-box.

According to the foregoing description of rays path inside the rod-equipped light guide assembly, the role of the rod is to split and in-couple ray intensity in the light guide assembly by portions thereof along internal propagation of rays of the virtual image from one side of the rod (e.g., in-coupling zone on the right) to the other side of the rod (e.g., end of the rod on the left). The role of the O—O element is to reflect and expand a beam made of rays coming from the rod in several planes parallel to an incident plane of rays incident on active surface of the O—O element. The role of the 150 element is to expand a beam of the rays out of the O—O element in the incidence plane of said rays. Finally, the role of the Y—Y element is to extract the guided rays out of the light guide assembly.

Figure 4A:
FIG. 4A schematically represents a cross section of a first monolithic part of a light guide assembly according to an embodiment of this invention.

The light guide assembly comprises two transparent monolithic optical parts having the same refraction index. FIG. 4A shows a cross section of the first transparent monolithic optical part 400, which a first surface comprising two prism arrays 403 (for the O—O element) and 405 (for the Y—Y element) separated by a flat area 404 (for the 150 element). The first transparent monolithic optical part 400 has an opposite second surface 406, which is flat and parallel to the flat area 404 of the first surface.

Figure 4B:
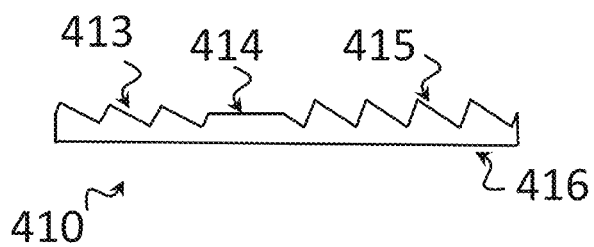
FIG. 4B schematically represents a cross section of a second monolithic part of the light guide assembly according to an embodiment of this invention.

FIG. 4B shows a cross section of the second transparent monolithic optical part 410. The second transparent monolithic optical part 410 has a first surface comprising two prism arrays 413 (for the O—O element) and 415 (for the Y—Y element) separated by a flat area 414 (for the 150 element). The first surface of the second transparent monolithic optical part 410 has prism arrays 413 and 415, and a flat surface 414 in between, so that its shape is geometrically complementary to the first surface of the first transparent monolithic optical part 400. The second transparent monolithic optical part 410 has an opposite second surface 416, which is flat and parallel to the flat area 414 of the first surface.

Figure 4C:
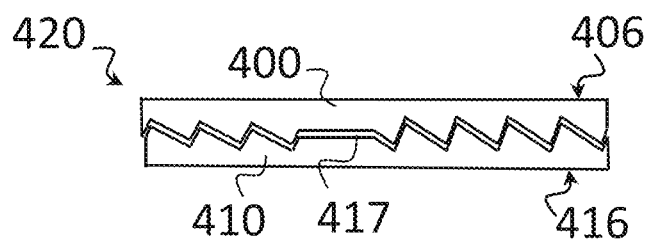
FIG. 4C schematically represents a cross section of the first and second monolithic parts of the light guide assembly assembled together according to an embodiment of this invention.

FIG. 4C shows a cross section of an assembly of the first transparent monolithic optical part 400 and of second transparent monolithic optical part 410 so as to form the light guide assembly 420. The assembly is made thanks to a transparent adhesive material 417, such as transparent glue, having the same refraction index as the first and second transparent monolithic optical parts 400 and 410. The assembly is such that the second surfaces 406 and 416 of respectively the first and second transparent monolithic optical parts 400 and 410 are parallel to each other after assembling operation.

Figure 4D:
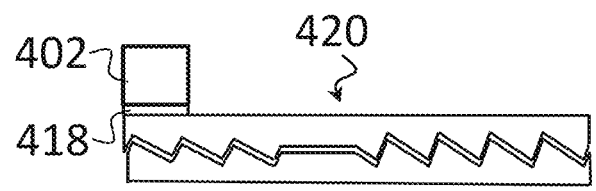
FIG. 4D schematically represents a cross section of the first and second monolithic parts of the light guide assembly assembled together with a rod, so as to form a rod-equipped light guide assembly, according to an embodiment of this invention.

FIG. 4D shows a cross section of an assembly of the light guide assembly 420 with a transparent rod 402 using a transparent adhesive material 418, such as glue, so as to form the rod-equipped light guide assembly. The transparent adhesive material 418 has preferably the same refraction index as the rod and the light guide assembly.

In FIG. 4D, the rod 402 is assembled with the light guide assembly 420 in such a way that the junction between the rod 402 and the light guide assembly 420 is made on one external large surface of the light guide assembly (on which the rays of the virtual image propagate by total internal reflection inside the light guide assembly). The rod 402 and the light guide assembly 420 are joined such that the in-coupled rays of the virtual image are transmitted, by the rod 402 to the light guide assembly 420 through the junction, in the direction of the O—O element of the light guide assembly 420, so as to be further propagated through the light guide assembly and extracted by the Y—Y element through the pre-defined eye-box.

Figure 5A:
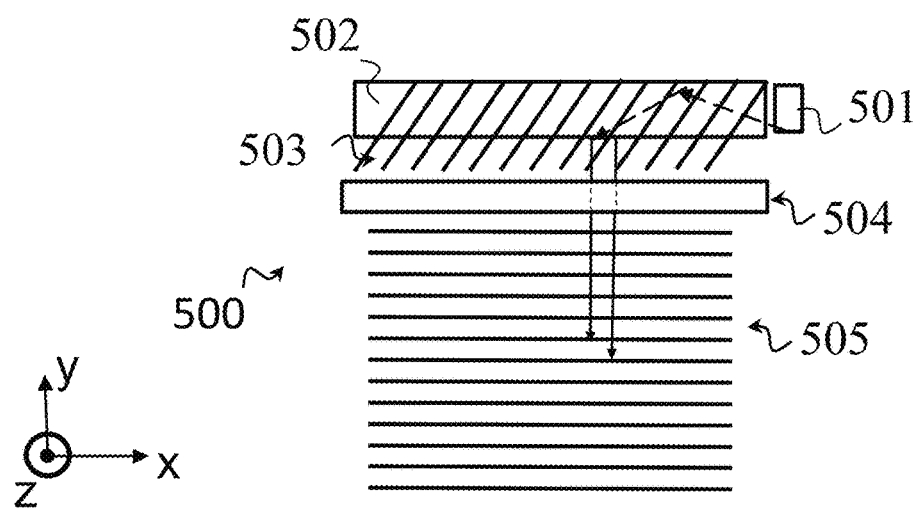
FIG. 5A schematically represents a top view of the rod-equipped light guide assembly according to an embodiment of this invention.

FIG. 5A schematically shows a top view of the rod-equipped light guide assembly 500 in a x,y plane of a reference direct orthonormal coordinate system of the rod-equipped light guide assembly 500 defining x, y and z directions, wherein thickness of the light guide assembly lies in the z direction of said reference direct orthonormal coordinate system. The rod 502 extends in the z direction. In FIG. 5A, the light guide assembly is only schematically represented by its main components, namely the O—O element 503, the 150 element 504 and the Y—Y element 505.

The rays of the virtual image are in-coupled to the rod 502 by an in-coupling means 501. The in-coupling means 501 is an arrangement of the rod 502, or onto the rod 502, which enables rays of the virtual image to be injected in the rod 502 for further transmission to the light guide assembly. The rays of the virtual image are in-coupled in such a way that said rays travel inside the rod 502 by multiple reflections using total internal reflection phenomena. The partially reflective gradient coating on one external surface of the rod 502 which makes the interface with the light guide assembly splits the ray intensity into reflected and transmitted portions thereof. The reflected portion of ray intensity continues to be propagated inside the rod using total internal reflection phenomena, which thus creates other portions of ray intensity transmitted to light guide assembly the along the rod length. The transmitted portions of ray intensity are thus in-coupled to the light guide assembly.

The rays issued from the rod in the light guide assembly are transmitted by total internal reflection inside the light guide assembly. When said rays hit an active surface of the O—O element 503, on which partially reflected coating is applied, a portion of the ray intensity is transmitted and continues to propagate by total internal reflection so as to hit another active surface of the O—O element 503 and so on. Another portion of ray intensity changes its direction and continues to propagate inside the light guide assembly so as to hit the 150 element 504. The 150 element 504 has a partially reflective coating, preferably with 50% transmission and 50% reflection, to split (e.g., equally) the incident rays during propagation inside the light guide assembly in order to completely fill the light guide assembly with necessary field rays. When the rays hit the ISO element 504, one portion of intensity thereof is transmitted, and another portion of intensity thereof is reflected. Both continue to propagate and hit the active surfaces of the Y—Y element 505. When hitting an active surface of the Y—Y element 505, the rays in question splits in transmitted and reflected portions of intensity thereof. The transmitted portion continues to propagate by total internal reflection and then hit another active surface of the Y—Y element 505. The reflected portion is extracted outside the light guide assembly through the predefined eye box.

Figure 5B:
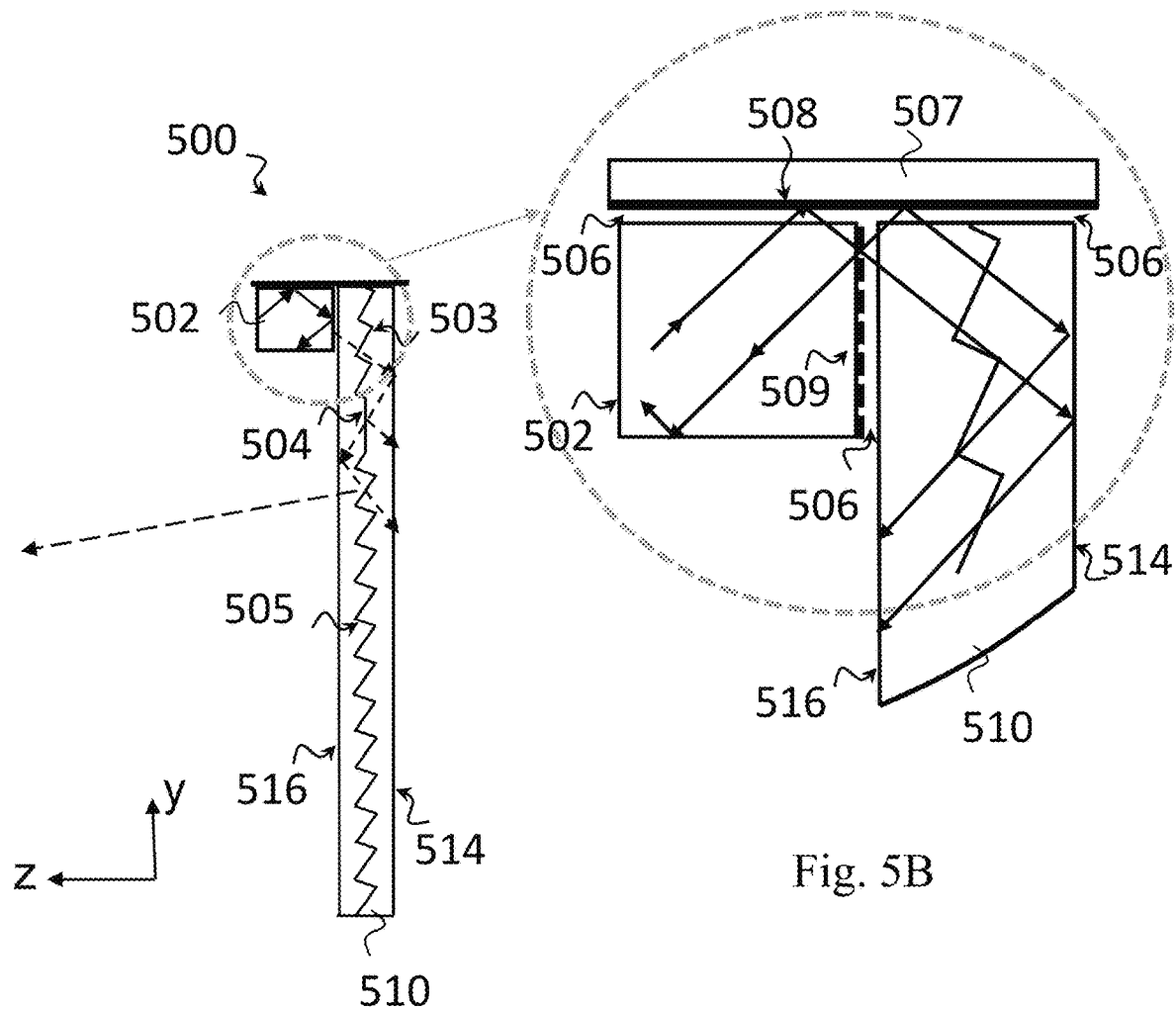
FIG. 5B schematically represents a cross section of the rod-equipped light guide assembly according to an embodiment of this invention.

FIG. 5B schematically illustrates, according to a particular embodiment, a cross section of the rod-equipped light guide assembly 500 within y,z plane, where the interface between the rod 502 and the light guide assembly 510 is shown in close-up detail. In this exemplary embodiment, the rod 502 has a regular solid square cross section along the junction with the light guide assembly 510 and thus has four external surfaces. The four sides of the square section have equal size and the angle between the corresponding adjacent surfaces of the rod 502 is 90 degrees. The rod 502 is assembled to the light guide assembly 510 with an adhesive material 506, having preferably the same refraction index as the rod and the light guide assembly 510. The rays of the virtual image in-coupled to the rod 502 propagates by total internal reflection and are partially transmitted to the light guide assembly 510 through a coated external surface of the rod 502 with partially reflective gradient coating, which forms the interface 509 between the rod 502 and the light guide assembly 510.

In a particular embodiment, in order to reflect rays at the edge of the light guide assembly, a reflecting mirror 507 is used. The reflecting mirror 507 can be made of transparent material with a 100% reflecting coated surface 508. The assembly of the reflecting mirror 507 with the rod 502 and the light guide assembly 510 is ensured by the transparent adhesive material 506 thus joining the edge of the light guide assembly and one long face (side) of the rod to said 100% reflecting coated surface 508. Said long face of the rod which is in contact with the 100% reflecting coated surface 508 via said transparent adhesive material 506 is perpendicular to the face of the rod used to make the interface with the light guide assembly. This particular embodiment reduces alignment tolerances in the z direction, since the rod 502 and the light guide assembly are settled to a same planar reference provided by the 100% reflecting coated surface 508. This particular embodiment is notably advantageous when the rod 502 and the light guide assembly are manufactured by molding techniques since the adhesive material 506 and the reflection by the 100% reflecting coated surface 508 compensate for flatness slight defects on the edge of the light guide assembly and/or of the face of the rod 502 in question.

FIG. 5B shows in close details rays of the virtual image propagating inside the rod 502 and transmitted to the light guide assembly 510 by the partially reflective gradient coating on the rod 502. FIG. 5B shows that rays transmitted by the interface 509 are in-coupled to the light guide assembly, where portion of intensity thereof is reflected by the active surfaces of the O—O element and another portion of intensity thereof is transmitted and continue to propagate by total internal reflection. The reflective coated surface 508 of the reflecting mirror 507 has the function of reflecting rays back to the direction of the light guide assembly, which avoids loss of rays of the virtual image.

Figure 5C:
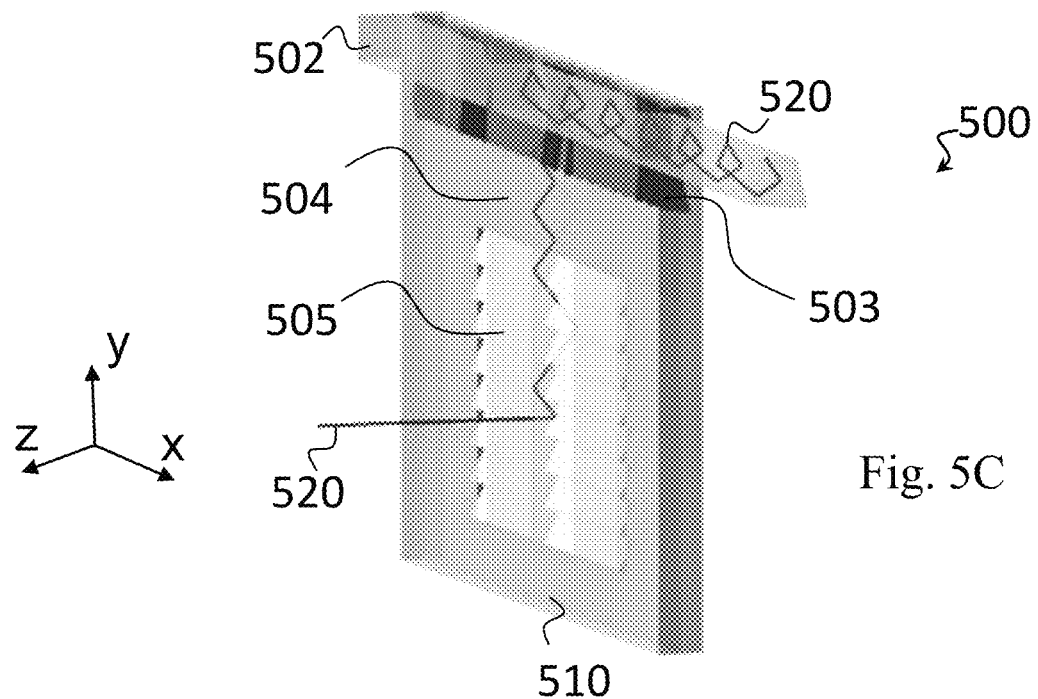
FIG. 5C schematically represents a 3D view of the rod-equipped light guide assembly according to an embodiment of this invention.

FIG. 5C shows a 3D view of the rod-equipped light guide assembly 500 shown in FIG. 5B. A trace of a path followed by a single ray 520 is also shown in FIG. 5C. After in-coupling, the ray 520 is internally reflected by the four long faces of the rod 502. After transmission from the rod 502 to the light guide assembly 510, the ray 520 hits an active surface of the O—O element 503, where the ray 520 is reflected. After such reflection and split by the ISO element 504, the ray 520 continues to be guided inside the light guide assembly 510 and is out-coupled by an active surface of the Y—Y element 505 toward the predefined eye-box.

Figures 5D, 5E:
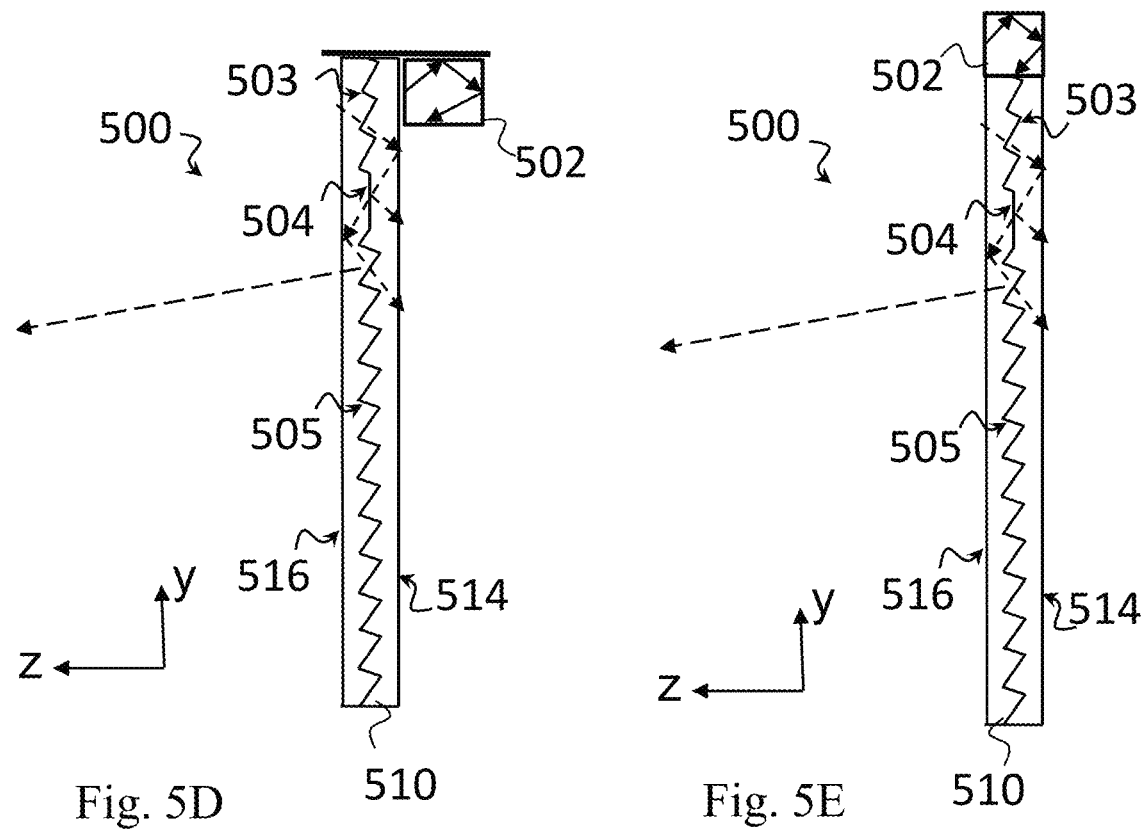
FIG. 5D schematically represents a cross section of another arrangement of the rod-equipped light guide assembly according to an embodiment of this invention.
FIG. 5E schematically represents a cross section of another arrangement of the rod-equipped light guide assembly according to an embodiment of this invention.

FIG. 5D shows a cross section of the rod-equipped light guide assembly 500, where the predefined eye-box is located on the other side of the light guide assembly 510 with respect to the rod 502. The assembly of the rod 502 with the light guide assembly 510 is similar as explained above with respect to FIG. 5B. This arrangement offers an alternative for integrating the rod-equipped light guide assembly 500 inside a glass frame.

FIG. 5E shows a cross section of rod-equipped light guide assembly 500, where the rod 502 is located in the same plane as the light guide assembly 510. The rod 502 is assembled onto the edge of the light guide assembly 510 and forms a thin, potentially completely flat, plate that eases integration inside a glass frame. This is another arrangement in which the rod 502 and the light guide assembly 510 are joined such that the in-coupled rays of the virtual image are transmitted, by the rod 502 to the light guide assembly 510 through the junction thereof, in the direction of the O—O element 503 of the light guide assembly 510, so as to be further propagated through the light guide assembly 510 and extracted by the Y—Y element 505 through the predefined eye-box.

Figure 6A:
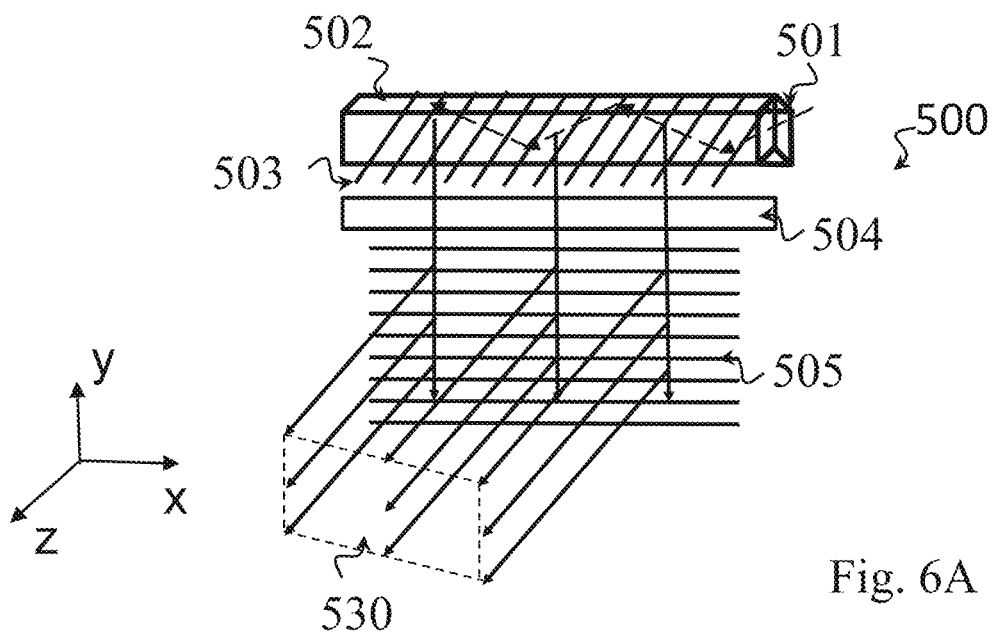
FIG. 6A and FIG. 6B schematically represent perspective views of the rod-equipped light guide assembly shown in FIG. 5A, with an in-coupling zone located on the right side for FIG. 6A or on the left side for FIG. 6B, further showing extraction of rays to form an eye-box, according to an embodiment of this invention.

FIG. 6A schematically shows a perspective view of the particular embodiment of FIG. 5A, where the in-coupling means 501 is shown on the right side of the rod-equipped light guide assembly 500, typically for being used with the user's right eye. The rays of the virtual image which are extracted by the Y—Y element 505 hit the predefined eye-box 530, through which the virtual image is seen by the user in a superimposed manner with the real-world scene.

Figure 6B:
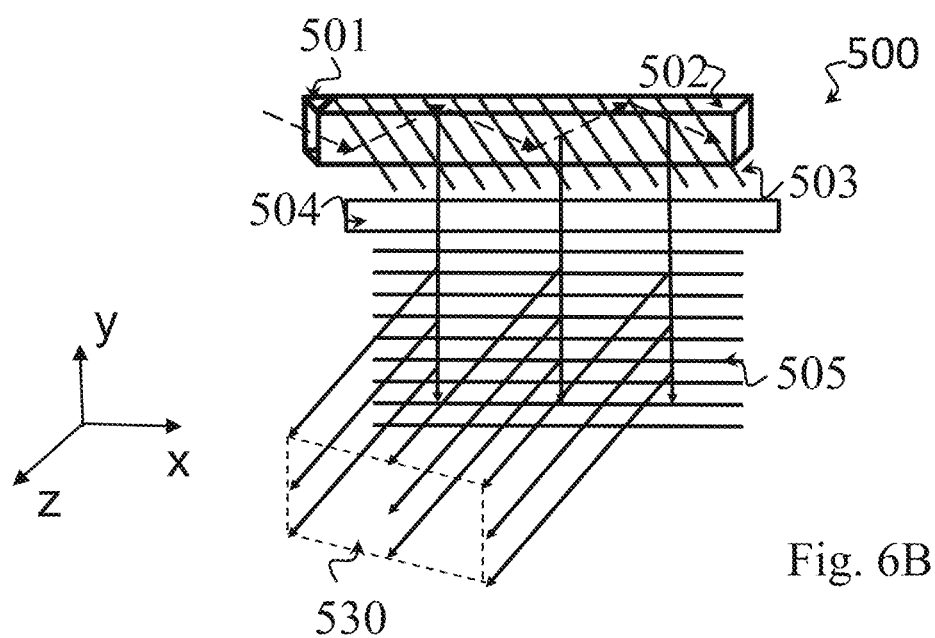

FIG. 6B schematically shows a perspective view of similar arrangement as in FIG. 6A, except that the in-coupling means 501 is shown on the left side of the rod-equipped light guide assembly 500, typically for being used with the user's left eye. The rays of the virtual image which are extracted by the Y—Y element 505 hit the predefined eye-box 530, where the virtual image is seen by the user in a superimposed manner with the real-world scene.

In FIGS. 6A and 6B, as in FIG. 5A, the light guide assembly is only schematically represented by its main components, namely the O—O element 503, the ISO element 504 and the Y—Y element 505.

Figure 7:
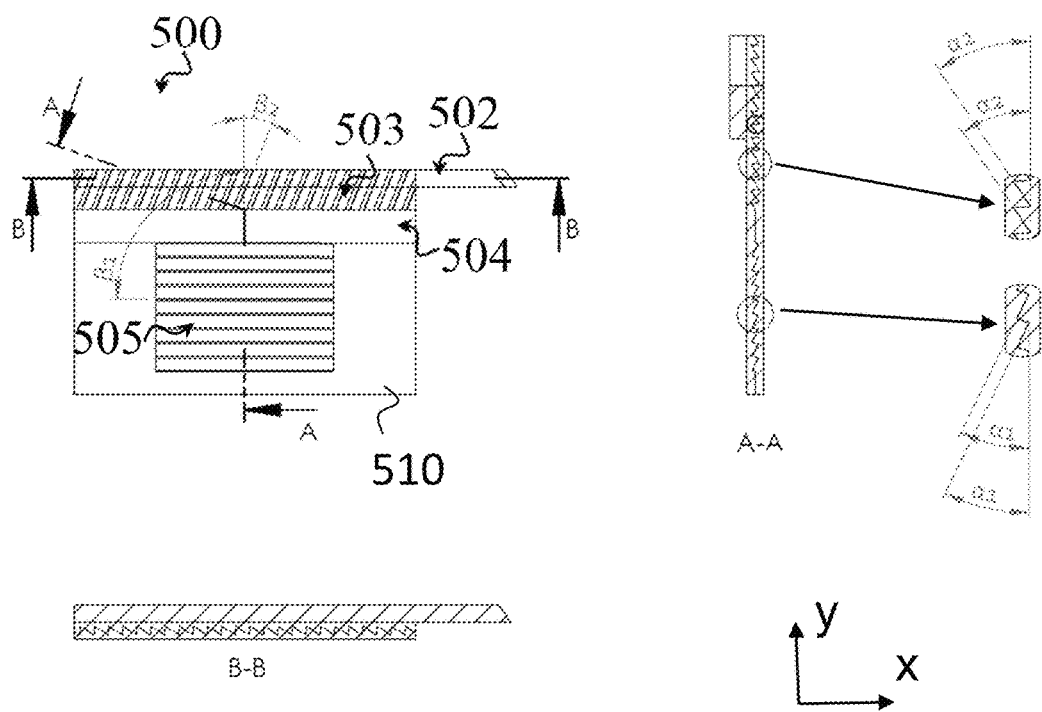
FIG. 7 schematically represents a top view and two cross sections of the rod-equipped light guide assembly according to an embodiment of this invention.

FIG. 7 shows two cross sections (A-A and B-B) of the rod-equipped light guide assembly. The A-A cross section on the right side of the drawing follows a broken line of two segments on the top view on the left side of the drawing so as to show the sections of the Y—Y and O—O elements perpendicular to the direction along which the long edges of both prism arrays are aligned. The B-B cross section is made of one segment along the x direction, and aims at showing the position of the rod, as well as the prism angles of the prism arrays of the O—O element. Each prism array can be defined by two angles: $\alpha 1$ and $\beta 1$ for the O—O element 503, and α2 and β2 for the Y—Y element 505. The angle α1, α2 is the angle between the external flat surfaces of the light guide assembly and the active surfaces of the prism array in question, and the angle β1, β2 is the orientation of the prism array in question versus they direction.

The angles α1, α2 and the angles β1, β2 are defined, for example using simulations or experiments in laboratory, in accordance with the junction of the rod and the light guide assembly and with the in-coupling means so that the rays of the virtual image can propagate through the rod and the light guide assembly from the collimator system to the predefined eye-box as explained above.

As an example of one embodiment, an image having a 60-degree field of view can be in-coupled and extracted with a large eye-box through a light guide assembly made of zeonex material with 3 mm total thickness on which a square rod of 3 mm thickness and 60 mm length is assembled. The light guide assembly external dimensions can then be 60 mm×40 mm with also 3 mm thickness. The prism array of the Y—Y element has a pitch of 2.5 mm, and the prism array of the O—O element has a pitch of 2.3 mm, wherein the pitch is the distance between any successive prisms of the prism array in question. The optimized angles to avoid ghost images are for the prism array of the Y—Y element: α1=26.2 degrees and β1=90 degrees. For the prism array of the O—O element: α2=34 degrees and β2=22 degrees. The width of the coated area of the 150 element is 5.8 mm.

Figure 8A:
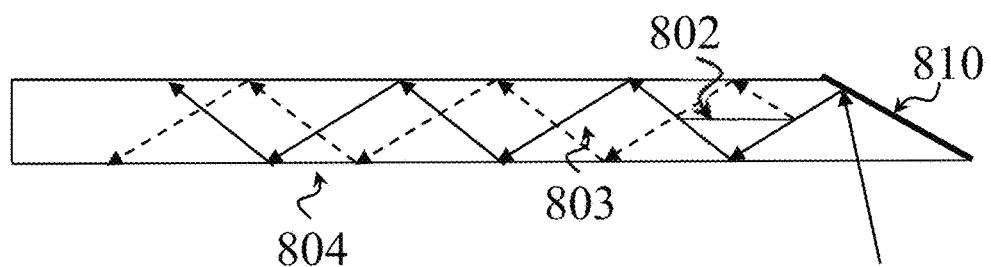
FIG. 8A schematically represents a cross section of the rod with reflective in-coupling means, where a partially reflective layer is present inside the rod and where reflections and propagation of rays are shown, according to an embodiment of this invention.

FIG. 8A shows a first embodiment of the in-coupling means inside the rod 804. The rod 804 has an embedded partially reflective flat surface 802, which for example substantially reflects 50% of light and transmits 50% of light. The rays of the virtual image are in-coupled using a fully reflective surface 810. The position and length of the partially reflective surface 802 in the rod 804 are determined by the less oblique field where transmitted and reflected rays cross after one total internal reflection on an external flat surface of the rod 804. The length is fixed greater than or equal to e*TAN(ω), where ω is the largest incident angle of the rays of the virtual image and e is the total thickness of the rod 804.

Figure 8B:
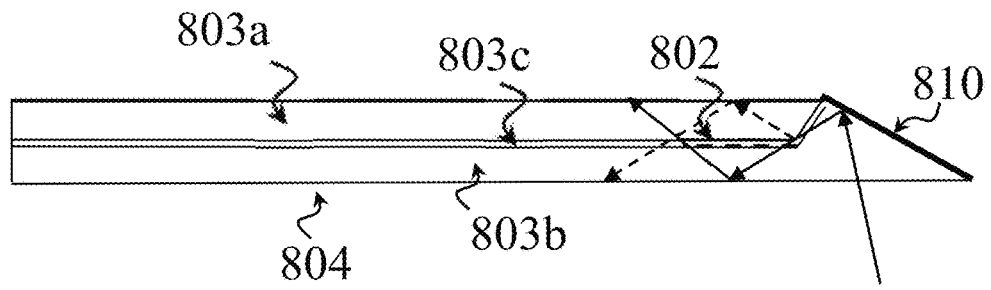
FIG. 8B schematically represents a cross section of the rod with reflective in-coupling means, where the rod comprises two assembled transparent optical parts to ease implementation of the partially reflective layer inside the rod and where reflections and propagation of rays are shown, according to an embodiment of this invention.

FIG. 8B shows an example of how to implement the embedded partially reflective flat surface 802 with a partially reflective coating (e.g., 50% of ray intensity reflected and 50% of ray intensity transmitted) inside the rod 804 of FIG. 8A. The rod 804 is made of two parts 803*a* and 803*b* assembled together with a transparent adhesive material 803*c* having the same refraction index as the two parts 803*a* and 803*b*. The partially reflective coating 803*c* is applied on the flat surface 802 either on the part 803*a* or on the part 803*b* so that, when the two parts 803*a* and 803*b* are assembled, the coating in question makes the interface between the two parts 803*a* and 803*b* at the location of the flat surface 802 inside the rod 804.

Figure 8C:
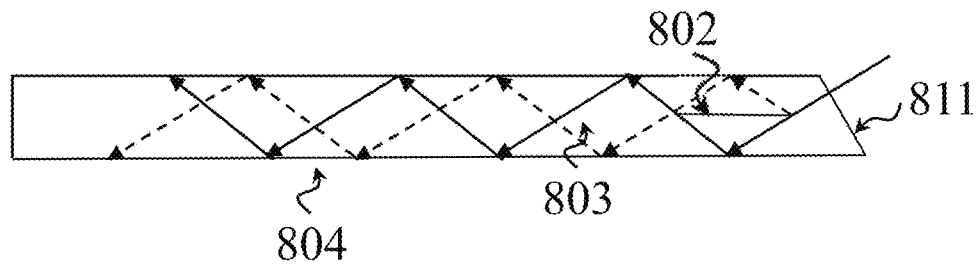
FIG. 8C schematically represents a cross section of the rod with transmissive in-coupling means, where a partially reflective layer is present inside the rod and where reflections and propagation of rays are shown, according to an embodiment of this invention.

FIG. 8C shows another embodiment of the in-coupling means inside the rod 804, wherein the rays of the virtual image are directly in-coupled inside the rod 804. The rod 804 embeds the partially reflective flat surface 802 disclosed above with respect to FIG. 8A. The rays of the virtual image are in-coupled through a fully transmissive surface 811. As disclosed above, the length of the partially reflective flat surface 802 is determined using the less oblique field where transmitted and reflected rays cross after one total internal reflection on an external flat surface of the rod 804.

Figure 8D:
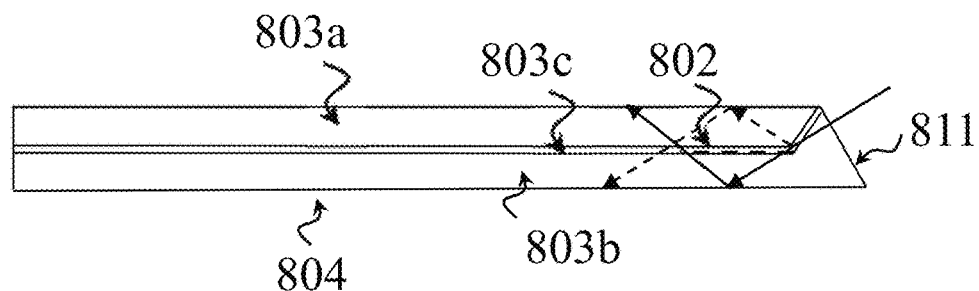
FIG. 8D schematically represents a cross section of the rod with transmissive in-coupling means, where the rod comprises two assembled transparent optical parts to ease implementation of the partially reflective layer inside the rod and where reflections and propagation of rays are shown, according to an embodiment of this invention.

FIG. 8D shows an example of how to implement the embedded partially reflective flat surface 802 with a partially reflective coating (e.g., 50% of ray intensity reflected and 50% of ray intensity transmitted) inside the rod 804 in FIG. 8C. The rod 804 is here again made of two parts 803*a* and 803*b* assembled together with a transparent adhesive material 803*c* having the same refraction index as the two parts 803*a* and 803*b*. The partially reflective coating 803*c* is applied on the flat surface 802 either on the part 803*a* or on the part 803*b* so that, when the two parts 803*a* and 803*b* are assembled, the coating in question makes the interface between the two parts 803*a* and 803*b* at the location of the flat surface 802 inside the rod 804.

Figure 8E:
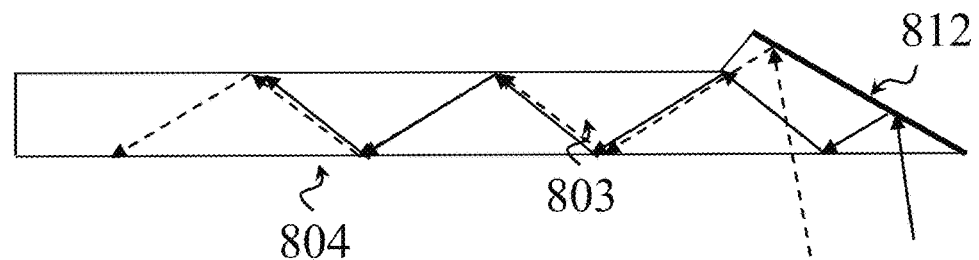
FIG. 8E schematically represents a cross section of the rod with another arrangement of reflective in-coupling means, where reflections and propagation of rays are shown, according to an embodiment of this invention.

FIG. 8E shows yet another embodiment of the in-coupling means, wherein the rays of the virtual image are in-coupled inside the rod 804, using a fully reflective surface 812. The two rays drawn in FIG. 8E are issued from the entry pupil border to fill the rod 804 with all fields of view.

Figure 8F:
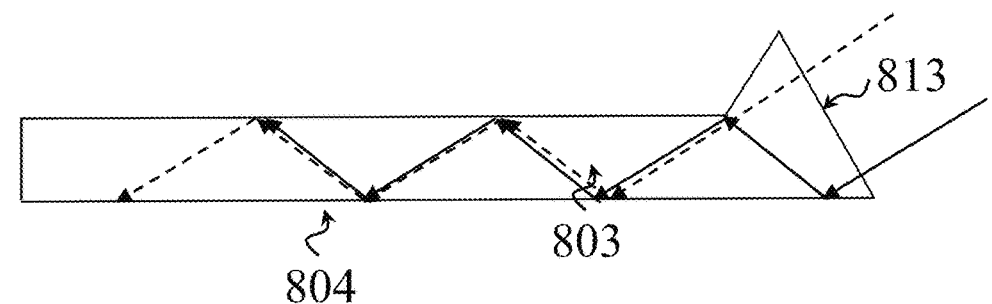
FIG. 8F schematically represents a cross section of the rod with another arrangement of transmissive in-coupling means, where reflections and propagation of rays are shown, according to an embodiment of this invention.

FIG. 8F shows yet another embodiment of the in-coupling means, wherein the rays of the virtual image are directly in-coupled inside the rod 804, through a fully transmissive surface 813. The two rays drawn in FIG. 8F are issued from entry pupil border to fill the rod 804 with all fields of view.

Figure 9:
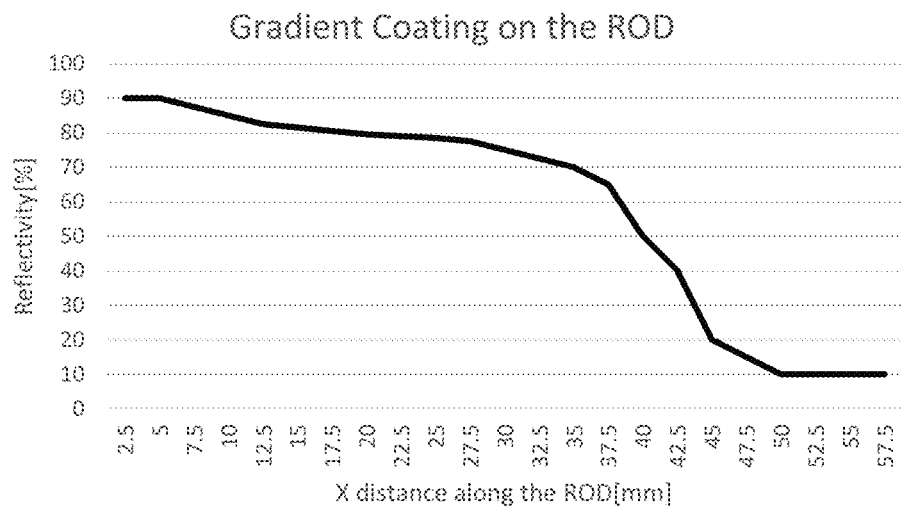
FIG. 9 represents a graph of an example of gradient coating reflectivity along rod length to extract ray intensity with uniform distribution, according to an embodiment of this invention.

FIG. 9 shows an example of evolution of reflectivity of the partially reflective gradient coating over the rod surface that is assembled to the light guide assembly, as referred to interface 509 in FIG. 5B. This graph shows how the reflectivity of the partially reflective surface, expressed in percentage of reflectivity of incident light, changes with distance. At a 0 mm position, close to the in-coupling zone, the reflectivity is around 90%. The reflectivity at the opposite end point of the rod is 10%. In-between, the reflectivity decreases. The decrease of reflectivity over distance is not linear but it enables uniform distribution of the rays of the virtual image into the light guide assembly.

Figure 10:
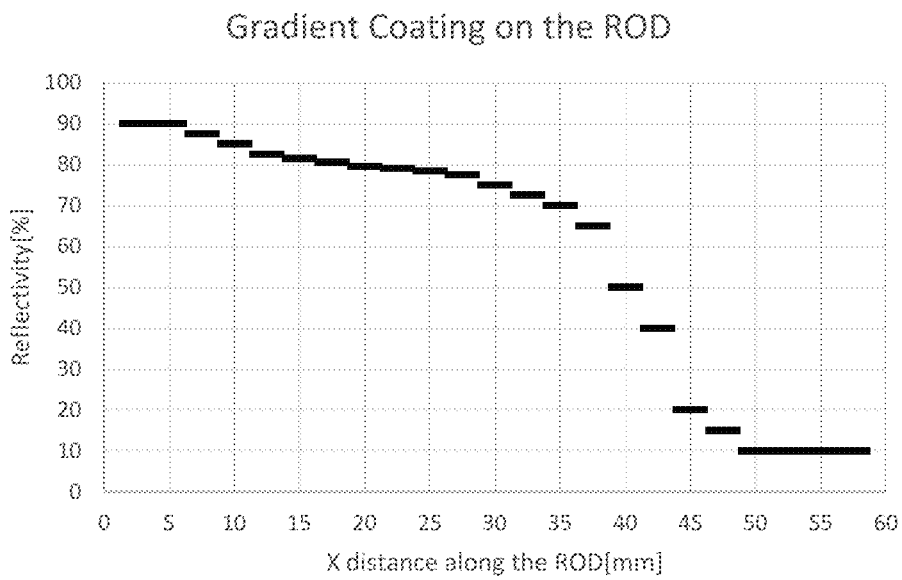
FIG. 10 represents a graph of another example of gradient coating reflectivity along rod length to extract ray intensity with substantially uniform distribution, according to an embodiment of this invention.

FIG. 10 shows an example of another possible evolution of reflectivity of the partially reflective gradient coating over the rod surface that makes the interface 509 between the rod and the light guide assembly. In FIG. 10, the reflectivity is adjusted by steps over distance. Each step has equal distance range size. The reflectivity is constant over each step and decreases from one step to another with distance from the in-coupling zone.

Figure 11:
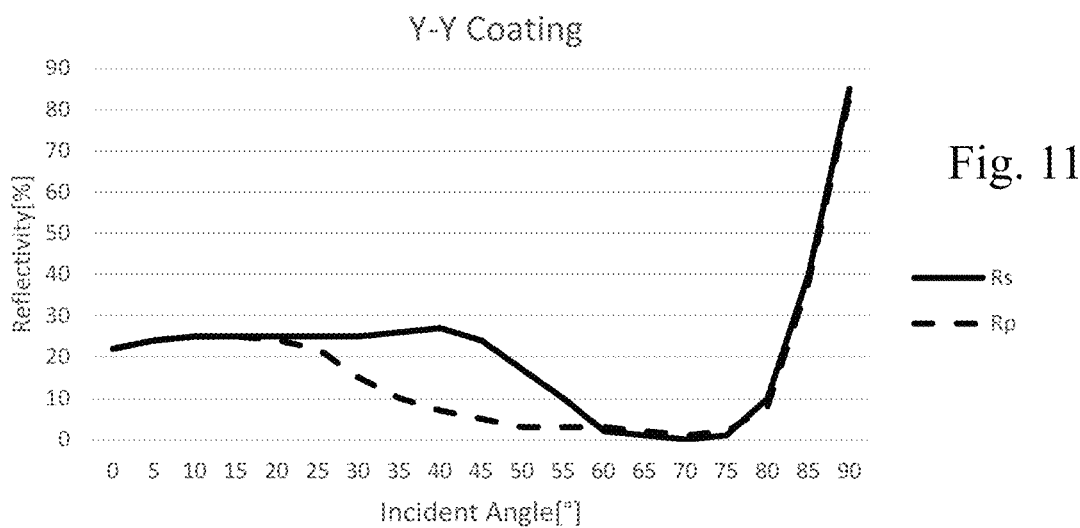
FIG. 11 represents a graph of coating reflectivity for a Y—Y element of the light guide assembly versus an angle of incidence for both s and p polarization states inside light guide assembly substrate, according to an embodiment of this invention.

FIG. 11 shows an example of coating on the active surfaces of the prism array of the Y—Y element. FIG. 11 shows reflectivity inside the light guide assembly material versus angle of incidence. In FIG. 11, the ray intensity is partially reflected between 23 degrees and 39 degrees of incidence angle value, for a field of view of 60 degrees. Other values may be selected, and other curve shape may be applied, depending on the field of view. In the example of FIG. 11, the ray intensity is transmitted for large incident angle values, namely between 65 degrees and 80 degrees, in order to reduce ghost image occurrences and maintain light propagation efficiency. FIG. 11 shows the reflectivity for both polarization states s and p, perpendicular and parallel to the incidence plane.

Complementarily, the active surfaces of the prism array of the O—O element are for example covered by a constant 50% reflective –50% transmissive coating.

In a particular embodiment, the external parallel flat surfaces of the light guide assembly are covered by an anti-reflection coating.

Figure 12A:
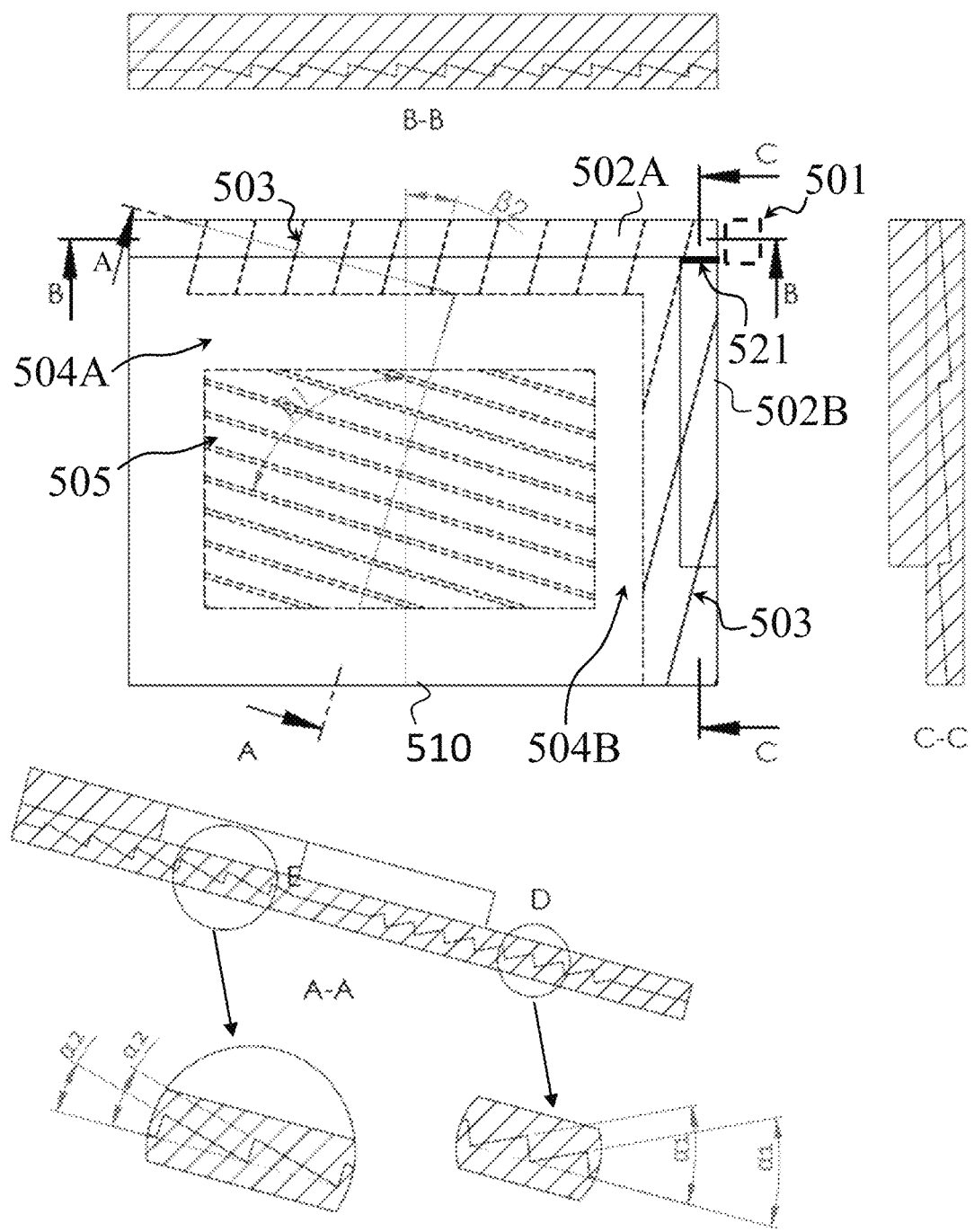
FIG. 12A schematically represents a top view and cross sections for providing the light guide assembly with two rods, according to an embodiment of this invention.

FIG. 12A shows an arrangement of a rod-equipped light guide assembly with two rods 502A and 502B. Both rods lie in the same x,y plane and are perpendicular to each other. The rays of the virtual image are in-coupled to the rods 502A and 502B by the in-coupled means 501. The two rods 502A and 502B are perpendicularly assembled together so as to obtain an L-shape. On a surface 521 at the junction of the two rods 502A and 502B a partially reflective coating (e.g., 50% of ray intensity reflected and 50% of ray intensity transmitted) is applied so as to split the images rays inside the rod into two directions, one toward the rod 502A and one toward the rod 502B.

This is yet another arrangement in which the rods 502A and 50B and the light guide assembly are joined such that the in-coupled rays of the virtual image are transmitted, by the rods 502A and 502B to the light guide assembly through the junction, in the direction of the O—O element of the light guide assembly, so as to be further propagated through the light guide assembly and extracted by the Y—Y element through the pre-defined eye-box.

FIG. 12A further shows three cross sections (A-A, B-B and C-C). The A-A cross section on the left side of the drawing follows a broken line of two segments on the top view on the left side of the drawing so as to show the sections of the Y—Y and O—O elements perpendicular to the direction along which the long edges of both prism arrays are aligned. The A-A cross section also comprises zoomed-in views of the prism angles of the prism arrays of the Y—Y and O—O elements. The B-B cross section is made of one segment (horizontal on FIG. 12A), and aims at showing the section of the rod 502A. The C-C cross section is made of one segment (vertical on FIG. 12A), and aims at showing the section of the rod 502B.

The rods 502A and 502B are assembled to the light guide assembly in the same way as already disclosed above. As above, the light guide assembly comprises two prism arrays: the prism array of the O—O element toward which the two rods transmit the in-coupled rays of the virtual image, and the prism array of the Y—Y element. The rays of the virtual image travelling inside each rod 502A, 502B are partially reflected by the partially reflective gradient coating at the interface between the rod 502A, 502B in question and the light guide assembly, and continue to propagate inside the rod 502A, 502B in question by total internal reflection. The rays of the virtual image which are transmitted in the light guide assembly by the partially reflective gradient coating at the interface between the rod 502A, 502B in question and the light guide assembly hit the prism array of the O—O element, and are reflected by the active surfaces thereof. The rays reflected by the active surfaces of the O—O element split when hitting the ISO element 504A or 504B before hitting the active surfaces of the Y—Y element, where they are extracted outside the light guide assembly.

As an exemplary embodiment for this rod-equipped light guide assembly with two rods, two square rods of 3 mm thickness are assembled to a light guide assembly of 3 mm total thickness made of high refraction index transparent material like the OKP-1 from Osaka Gas Chemical, having refraction index nd=1.6422. The O—O element is such that $\alpha 1=25.2$ degrees and $\beta 1=17$ degrees, with a pitch of 2.5 mm. The Y—Y element is such that $\alpha 2=15$ degrees and $\beta 1=15$ degrees, with a pitch of 3.8 mm. The width of the 150 elements 504A and 504B areas are respectively 6.14 mm and 6 mm. This arrangement is able to extract image of a 60-degree field of view.

Figure 12B:
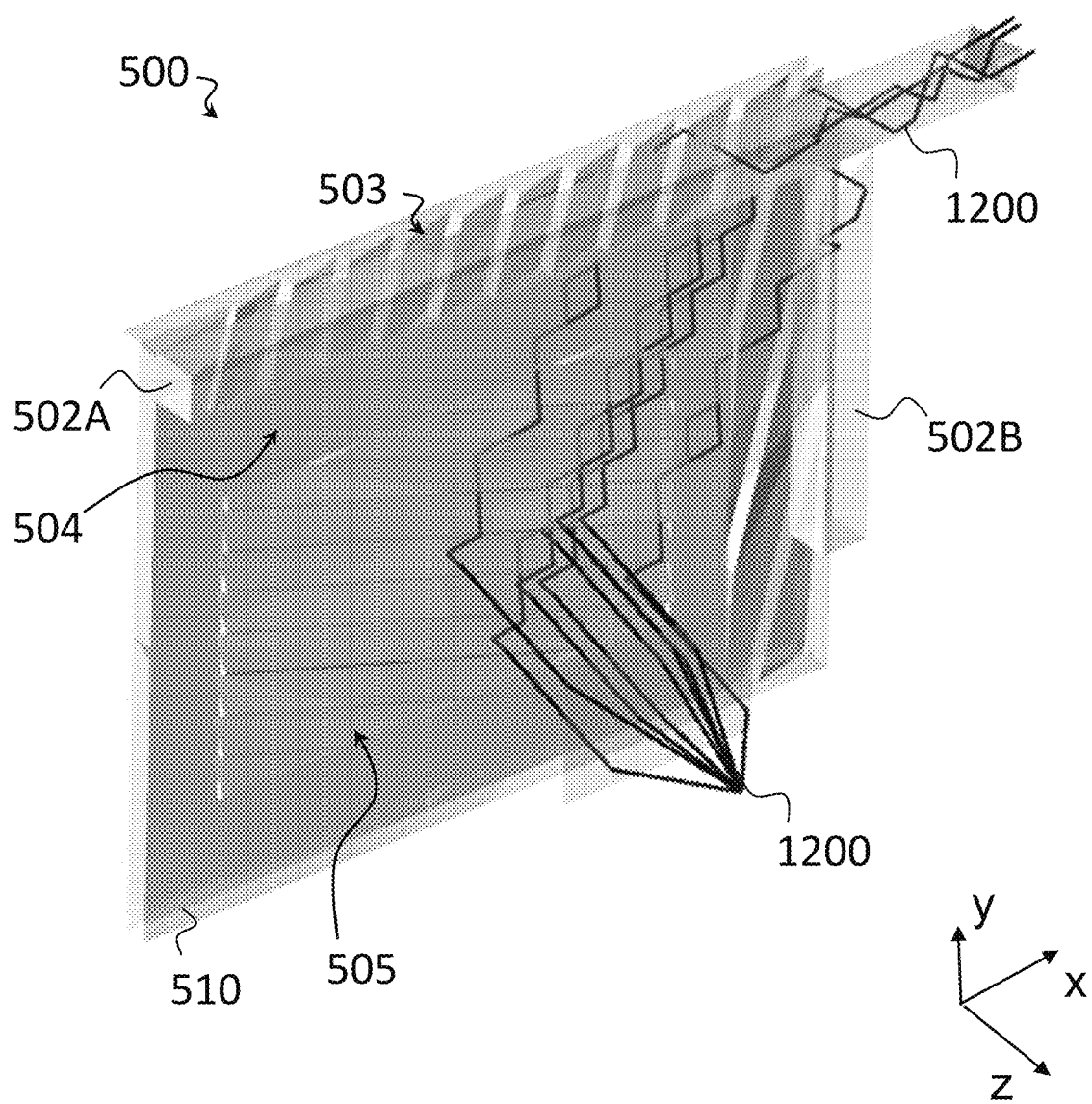
FIG. 12B schematically represents a 3D view for providing the light guide assembly with two rods, according to an embodiment of this invention.

FIG. 12B shows a 3D view of the arrangement of FIG. 12A for a rod-equipped light guide assembly with two rods. In FIG. 12B, paths of in-coupled rays 1200 of the virtual image are illustratively traced over the rod-equipped light guide assembly 500. The ray 1200 splits into two rays at the surface 521 between the two rod 502A and 502B. One part of intensity thereof continues to be guided inside the rod 502A and another part of intensity thereof is transmitted to rod 502B. Thus, two rays are generated for one in-coupled ray. After having been transmitted to the light guide assembly as already disclosed above, both rays are then respectively reflected by one active surface of the O—O element 503 adjacent to each rod 502A and 502B. The resulting rays continue to propagate inside the light guide assembly and hits the Y—Y element 505, where they are out-coupled toward the predefined eye-box. The out-coupled two rays are parallel to each other and recombines so as to form only one pixel of the virtual image in the user's eye.

Figure 13:
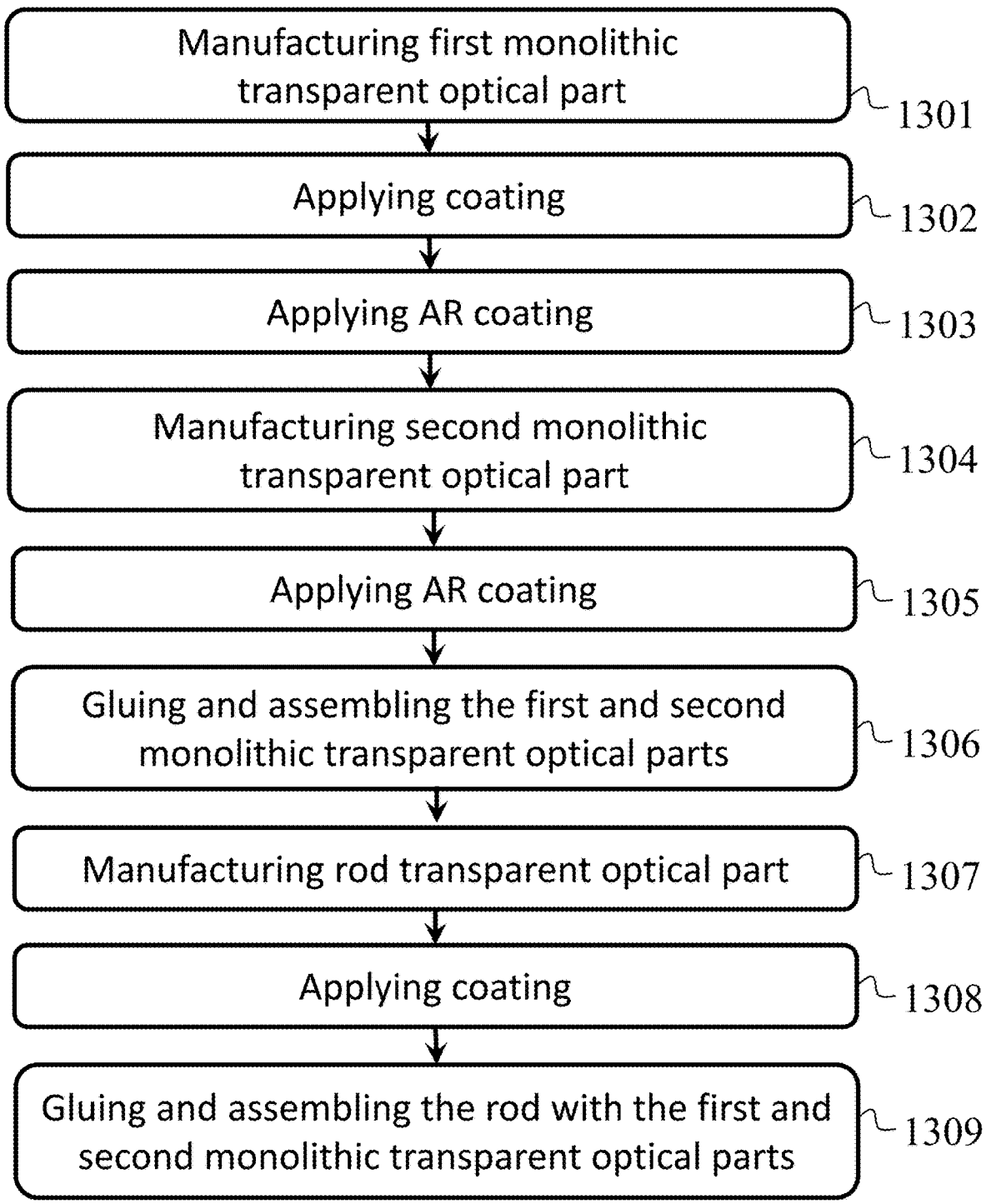
FIG. 13 schematically represents a method for providing the rod-equipped light guide assembly, according to an embodiment of this invention.

FIG. 13 depicts a method for manufacturing and assembling the first transparent monolithic optical part, the second transparent monolithic optical part and the rod so as to form the rod-equipped light guide assembly.

In a step 1301, the first transparent monolithic optical part is manufactured, for example by molding techniques, including injection molding, injection compression molding, hot embossing, resin thermoforming or by using a UV-cured monomer. The first transparent monolithic optical part may also be obtained by machining a block of plastic or glass. The first transparent monolithic optical part has prism arrays on one of its external surfaces, as already detailed with respect to FIG. 4A.

In a step 1302, a partially reflective coating is applied on the first transparent monolithic optical part so as to form the aforementioned ISO element, as well as on the prism arrays so as to form the active surfaces of the aforementioned O—O and Y—Y elements.

In an optional step 1303, an anti-reflection coating is applied in the other one of the external surfaces of the first transparent monolithic optical part, namely the one with no prism arrays thereon.

Figure 14:
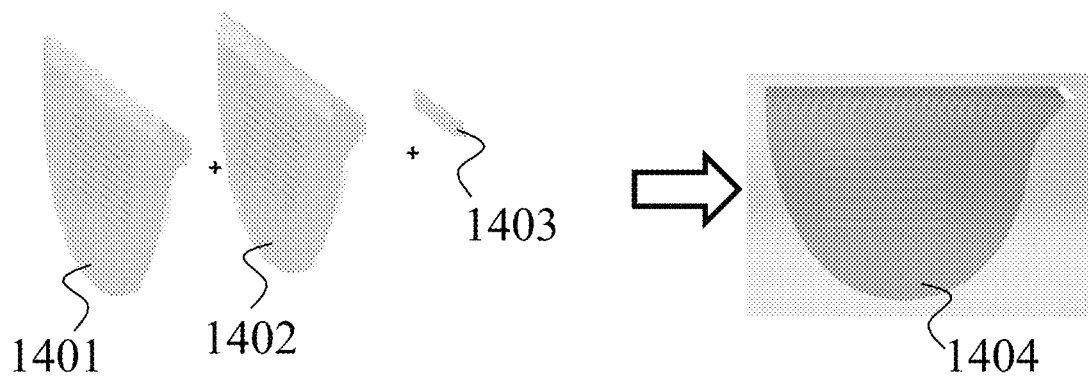
FIG. 14 schematically represents a rod-equipped light guide assembly obtained according to method shown in FIG. 13.

This resulting first transparent monolithic optical part is schematically shown as 1402 in FIG. 14.

In a step 1304, the second transparent monolithic optical part is manufactured, for example by molding techniques, including injection molding, injection compression molding, hot embossing, resin thermoforming or by using a UV-cured monomer. The second transparent monolithic optical part may also be obtained by machining a block of plastic or glass. The second transparent monolithic optical part has a complementary shape with respect to the first transparent monolithic optical part, as already detailed with respect to FIG. 4B. The refractive index of the material used to manufacture the second transparent monolithic optical part is similar as the one of the materials used to manufacture the first transparent monolithic optical part in order ensure optical continuity.

In an optional step 1305, an anti-reflection coating is applied in the other one of the external surfaces of the second transparent monolithic optical part, namely the one with no prism arrays thereon.

This resulting first transparent monolithic optical part is schematically shown as 1401 in FIG. 14.

In a step 1306, the first transparent monolithic optical part and the second transparent monolithic optical part are assembled together, using an adhesive material, such as glue. The prism arrays on the first surface of the first transparent monolithic optical part are placed opposite their complementary prism arrays on the first surface of the second transparent monolithic optical part, as already detailed with respect to FIG. 4C. The refractive index of the adhesive material is similar the one of the materials used to manufacture the first and second transparent monolithic optical parts to ensure optical continuity. After assembling the first transparent monolithic optical part and the second transparent monolithic optical part, the light guide assembly is formed with its external flat surfaces (faces) parallel to each other.

In a step 1307, the transparent rod with square section is manufactured for example by molding techniques, including injection molding, injection compression molding, hot embossing, resin thermoforming or by using a UV-cured monomer. The transparent rod may also be obtained by machining a block of plastic or glass. The refractive index of the material used to manufacture the rod is similar as the one of the material used to manufacture the first and second transparent monolithic optical parts, in order ensure optical continuity.

In a step 1308, a partially reflective gradient coating is applied to the surface of the rod (interface 509) that should be in contact with the light guide assembly as depicted in FIG. 5B.

This resulting rod is schematically shown as 1403 in FIG. 14.

In a step 1309, the rod is assembled to the light guide assembly using transparent adhesive material to form the rod-equipped light guide assembly as depicted in FIG. 4D.

The resulting rod-equipped light guide assembly is schematically shown as 1404 in FIG. 14.

Other steps may be added in the foregoing method, such as assembling two parts to form the rod using a transparent adhesive material having the same refraction index as said two parts, wherein a partially reflective coating is applied beforehand to an area of one of the two parts so as to form the embedded partially reflective flat surface 802 disclosed above.

Other steps may be added in the foregoing method, such as assembling the light guide assembling with two joined rods. In this case, two rods are manufactured and processed according to the steps 1307 and 1308 disclosed above. The two rods are joined together to form a L-shaped device using a transparent adhesive material having the same refraction index as the two rods, wherein a partially reflective coating is applied beforehand to a junction area of one of the rods which is used to form the L shape.

Other steps may be added in the foregoing method, such as applying coating so as to form the aforementioned reflective surface of the in-coupling means.

Other steps may be added in the foregoing method, such as assembling the light guide assembly with a collimator system to form a display module.

Other steps may be added in the foregoing method, such as adding partially reflective coating on parts of at least one external surface of the light guide assembly where internal reflections of the rays of the virtual image are intended and/or one parts of said at least one external surface of the light guide assembly where no reflections of the rays of the virtual image are intended. This homogenizes the transparency aspect of the light guide assembly and thus increases user's comfort.

Other steps may be added in the foregoing method, such as integrating the display module in a smart glass device or an Augmented Reality (AR) Head Mounted Display (HMD) or head worn display, either for a monocular or a binocular configuration. Other steps may be added in the foregoing method, such as integrating the display module in a Head Up Display (HUD), for example using a rod made of glass and a light guide assembly made of plastic.

Figure 15:
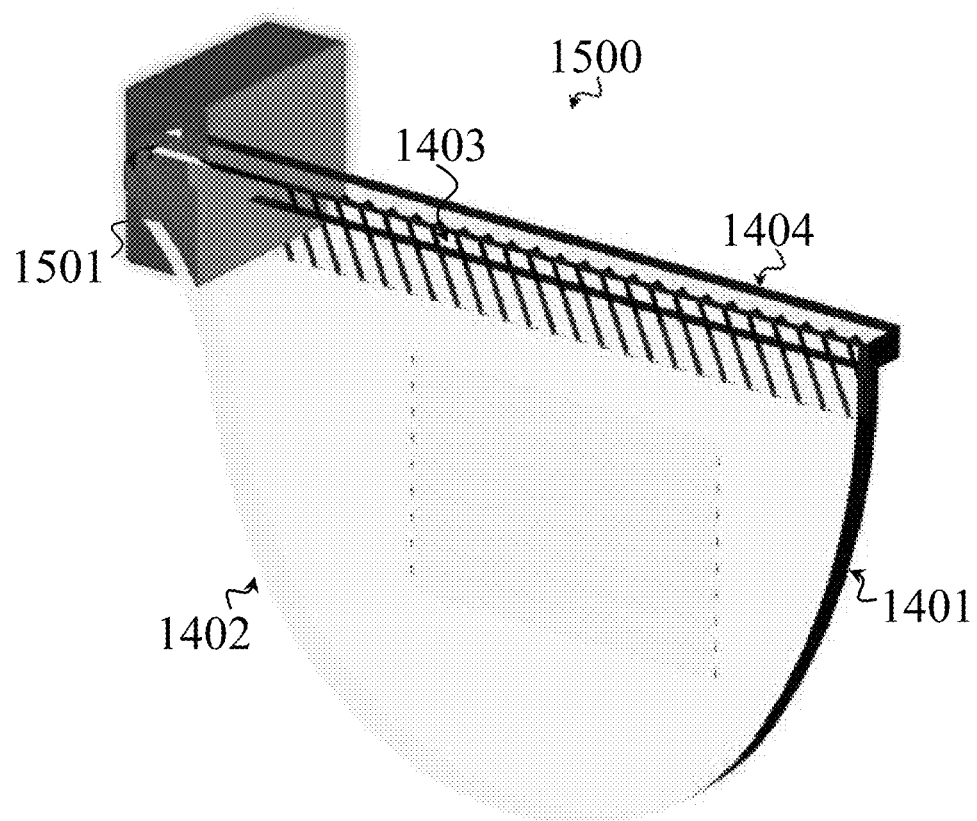
FIG. 15 schematically represents a perspective view of an example of display system including the rod-equipped light guide assembly, as well as a collimator system, for further integration into smart glasses or an Augmented Reality (AR) Head Mounted Display (HMD) or head worn display device or Head Up Display (HUD) device.

FIG. 15 schematically represents a display module 1500. The display module 1500 is an assembly of the rod-equipped light guide assembly 1404, which has been obtained by executing the method disclosed above with respect to FIGS. 13 and 14, and a collimator system 1501. The collimator system 1501 is arranged with the rod-equipped light guide assembly 1404 for projecting a virtual image at infinity and in-coupling rays thereof in the rod-equipped light guide assembly, via the rod 1403, to ensure propagation of rays as detailed above. With such an arrangement of the display module 1500, the collimator system 1501 can easily fit within an eyeglass frame temple.

Such a display module 1500 can be integrated into a smart glass device or an Augmented Reality (AR) Head Mounted Display (HMD) or head worn display, either for a monocular or a binocular configuration. In a variant, such a display module 1500 can be integrated into a Head Up Display (HUD).

The invention claimed is:

1. A rod-equipped light guide assembly comprising a rod and a light guide assembly, wherein the light guide assembly comprises:
   a first transparent monolithic optical part having a refractive index, and
   a second transparent monolithic optical part having the same refractive index as the first transparent monolithic optical part,
   wherein
   the first transparent monolithic optical part has a first surface having two prism arrays separated by a flat surface, the flat surface has a partially reflective coating thereon, and the first transparent monolithic optical part further has an opposite second surface that is flat,
   each prism array of the first surface of the first transparent monolithic optical part has at least two prisms, each prism being composed of a first surface and a second surface which are oblique with respect to each other and with respect to said opposite second surface of the first transparent monolithic optical part, the first surfaces of the prism arrays have a partially reflective coating thereon and the second surfaces of the prism arrays have no reflective coating thereon,
   the second transparent monolithic optical part has a first surface having a geometrically complementary shape with respect to the shape of the first surface of the first transparent monolithic optical part, and the second transparent monolithic optical part of the light guide assembly further has an opposite second surface that is flat,
   the first and second transparent monolithic optical parts are assembled together using a first optically transparent adhesive material, such that the second surfaces of the first and second transparent monolithic optical parts of the light guide assembly are parallel to each other, the first optically transparent adhesive material having the same refractive index as the first and second transparent monolithic optical parts,
   and wherein the rod is transparent and has a partially reflective gradient coating on one of its surfaces via which the rod is assembled with the light guide assembly using a second optically transparent adhesive material.

2. The rod-equipped light guide assembly according to claim 1, wherein the rod comprises an in-coupling zone for in-coupling rays of a virtual image.

3. The rod-equipped light guide assembly according to claim 2, wherein:
   the flat surface between the prism arrays of the first surface of the first transparent monolithic optical part implements a splitting-plus-expansion function with respect to the rays of the virtual image,
   the last prism array of the first surface of the first transparent monolithic optical part, with respect to a global direction of propagation of the rays of the virtual image in the light guide assembly, implements a multiplication-plus-extraction function with respect to the rays of the virtual image, the first prism array of the first surface of the first transparent monolithic optical part, with respect to a global direction of propagation of the rays of the virtual image in the light guide assembly, implements a multiplication function with respect to the rays of the virtual image, and the rod implements a splitting and in-coupling function with respect to the rays of the virtual image by in-coupling the rays of the virtual image in the light guide assembly by portions thereof along internal propagation of rays of the virtual image inside the rod.

4. The rod-equipped light guide assembly according to claim 1, wherein the second optically transparent adhesive material is identical to the first optically transparent adhesive material.

5. The rod-equipped light guide assembly according to claim 1, wherein the rod is located in a same plane as the light guide assembly, the rod being assembled onto the edge of the light guide assembly.

6. The rod-equipped light guide assembly according to claim 1, wherein the rod is assembled with the light guide assembly on one external large surface of the light guide assembly.

7. The rod-equipped light guide assembly according to claim 6, wherein a reflecting mirror is assembled with the rod and the light guide assembly by the second transparent adhesive material thus joining an edge of the light guide assembly and one long face of the rod to said reflecting mirror, the long face of the rod which is in contact with the reflecting mirror via said second transparent adhesive material is perpendicular to a long face of the rod used to make interface with the light guide assembly.

8. The rod-equipped light guide assembly according to claim 2, wherein the rod comprises an embedded partially reflective flat surface, wherein position and length of the embedded partially reflective surface in the rod are determined using the less oblique field where transmitted and reflected rays cross after one total internal reflection on an external flat surface of the rod.

9. The rod-equipped light guide assembly according to claim 2, wherein reflectivity of partially reflective gradient coating is adjusted by steps over distance, all steps having equal distance range size, and wherein the reflectivity is constant over each step and decreases from one step to another with distance from the in-coupling zone.

10. The rod-equipped light guide assembly according to claim 1, wherein the rod has the same refractive index as the first and second monolithic optical parts of the light guide assembly.

11. The rod-equipped light guide assembly according to claim 1, comprising another rod, wherein both rods are perpendicular to each other in a L-shape, both rods being assembled with the light guide assembly and having a junction between the rods having a partially reflective coating thereon.

12. A display module formed by an assembly of the rod-equipped light guide assembly according to claim 1 and a collimator system, wherein the collimator system is arranged with the rod-equipped light guide assembly for projecting a virtual image at infinity and in-coupling rays of the virtual image in the rod.

13. A head-mounted display comprising a display module according to claim 12.

14. A head-up display comprising a display module according to claim 12.

15. A method for manufacturing a rod-equipped light guide assembly, comprising:

performing a manufacturing process to manufacture a rod that is transparent and to manufacture a first transparent monolithic optical part having a refractive index and a second transparent monolithic optical part having the same refractive index as the first transparent monolithic optical part, wherein following the manufacturing process the first transparent monolithic optical part has a first surface having two successive sets composed of one flat surface followed by one prism array, and the first transparent monolithic optical part further has an opposite second surface that is flat, each prism array of the first surface of the first transparent monolithic optical part has at least two prisms, each prism being composed of a first surface and a second surface which are oblique with respect to each other and with respect to said opposite second surface of the first transparent monolithic optical part, the second transparent monolithic optical part has a first surface having a geometrically complementary shape with respect to the shape of the first surface of the first transparent monolithic optical part, and the second transparent monolithic optical part of the light guide assembly further has an opposite second surface that is flat, wherein the manufacturing process further comprises:

applying a partially-reflective coating on the flat surface between the prism arrays of the first transparent monolithic optical part and on the first surfaces of the prism arrays of the first transparent monolithic optical part, while the second surfaces of the prism arrays of the first transparent monolithic optical part have no reflective coating thereon, assembling the first and second transparent monolithic optical parts together using an optically transparent adhesive material, such that the second surfaces of the first and second transparent monolithic optical parts of the light guide assembly are parallel to each other, the optically transparent adhesive material having the same refractive index as the first and second transparent monolithic optical parts, applying a partially reflective gradient coating on one surface of the rod, and assembling the rod with the light guide assembly, using a second optically transparent adhesive material, via the surface on which the partially reflective gradient coating has been applied.

* * * * *